United States Patent
Wang et al.

(10) Patent No.: US 12,404,393 B2
(45) Date of Patent: *Sep. 2, 2025

(54) PROPYLENE COPOLYMER COMPOSITION WITH EXCELLENT OPTICAL AND MECHANICAL PROPERTIES

(71) Applicant: BOREALIS AG, Vienna (AT)

(72) Inventors: Jingbo Wang, Linz (AT); Markus Gahleitner, Linz (AT); Klaus Bernreitner, Linz (AT); Peter Niedersüss, Linz (AT); Pauli Leskinen, Porvoo (FI)

(73) Assignee: Borealis AG, Vienna (AT)

( * ) Notice: Subject to any disclaimer, the term of this patent is extended or adjusted under 35 U.S.C. 154(b) by 349 days.

This patent is subject to a terminal disclaimer.

(21) Appl. No.: 17/273,687

(22) PCT Filed: Aug. 7, 2019

(86) PCT No.: PCT/EP2019/071169
§ 371 (c)(1),
(2) Date: Mar. 4, 2021

(87) PCT Pub. No.: WO2020/064190
PCT Pub. Date: Apr. 2, 2020

(65) Prior Publication Data
US 2022/0135779 A1    May 5, 2022

(30) Foreign Application Priority Data
Sep. 26, 2018 (EP) ..................... 18196812

(51) Int. Cl.
| | | |
|---|---|---|
| *C08L 23/12* | (2006.01) | |
| *B29C 48/00* | (2019.01) | |
| *B29C 48/08* | (2019.01) | |
| *B29C 48/40* | (2019.01) | |
| *C08F 4/6592* | (2006.01) | |
| *C08L 23/0807* | (2025.01) | |
| *C08L 23/14* | (2006.01) | |
| *C08L 23/20* | (2006.01) | |
| *B29K 23/00* | (2006.01) | |

(52) U.S. Cl.
CPC ............ *C08L 23/12* (2013.01); *B29C 48/022* (2019.02); *B29C 48/08* (2019.02); *B29C 48/40* (2019.02); *C08F 4/65927* (2013.01); *C08L 23/0807* (2013.01); *C08L 23/14* (2013.01); *C08L 23/20* (2013.01); *B29K 2023/14* (2013.01)

(58) Field of Classification Search
CPC ...................................................... C08L 23/12
See application file for complete search history.

(56) References Cited

U.S. PATENT DOCUMENTS

| | | | |
|---|---|---|---|
| 5,272,236 A | 12/1993 | Lai et al. | |
| 6,191,219 B1 | 2/2001 | Tanaka et al. | |
| 6,316,562 B1 | 11/2001 | Munck et al. | |
| 6,994,915 B2 | 2/2006 | Pelliconi et al. | |
| 8,586,675 B2 * | 11/2013 | Hirata | B32B 27/32 525/240 |
| 8,889,792 B2 * | 11/2014 | Paavilainen | C08J 5/18 525/197 |
| 8,993,678 B2 | 3/2015 | Galvan et al. | |
| 9,637,602 B2 | 5/2017 | Potter et al. | |
| 9,670,293 B2 | 6/2017 | Reznichenko et al. | |
| 9,670,347 B2 | 6/2017 | Tölsch et al. | |
| 9,708,481 B2 | 7/2017 | Wang et al. | |
| 9,745,431 B2 | 8/2017 | Potter et al. | |
| 9,751,962 B2 | 9/2017 | Wang et al. | |
| 9,777,142 B2 | 10/2017 | Sandholzer et al. | |
| 9,802,394 B2 | 10/2017 | Cavacas et al. | |
| 9,803,040 B2 | 10/2017 | Marzolla et al. | |
| 9,828,698 B2 | 11/2017 | Wang et al. | |
| 9,890,275 B2 | 2/2018 | Sandholzer et al. | |
| 9,976,020 B2 | 5/2018 | Nummila-Pakarinen et al. | |
| 10,011,708 B2 | 7/2018 | Lampela et al. | |
| 10,030,109 B2 | 7/2018 | Boragno et al. | |
| 10,040,930 B2 | 8/2018 | Gloger et al. | |

(Continued)

FOREIGN PATENT DOCUMENTS

| | | | |
|---|---|---|---|
| AU | 199964295 A1 | 5/2000 | |
| CN | 1230567 A | 10/1999 | |

(Continued)

OTHER PUBLICATIONS

Intellectual Property India, Examination Report in Indian Patent Application No. 202117016025 (Oct. 11, 2021).
Federal Institute of Industrial Property (Fiips), Office Action in Russian Patent Application No. 2021108383/04(017996) (Oct. 14, 2021).
Hubner et al., "Application of Melt-State NMR Spectroscopy for Polyolefin Characterization in Industry," Chapter 24 of *NMR Spectroscopy of Polymers: Innovative Strategies for Complex Macromolecules*, Editors: H. N. Cheng, Tetsuo Asakura, Alan D. English, vol. 1077, Chapter 24, pp. 401-415 (2011).

(Continued)

*Primary Examiner* — Irina Krylova
(74) *Attorney, Agent, or Firm* — Leydig, Voit & Mayer, Ltd.

(57) ABSTRACT

The present invention is directed to a polypropylene composition (P) comprising a copolymer (C) of propylene and 1-hexene comprising a first random propylene copolymer (A) of propylene and a 1-hexene, and a second random propylene copolymer (B) of propylene and 1-hexene having a higher 1-hexene content than the first random propylene copolymer (A) as well as a plastomer (PL) being an elastomeric copolymer of ethylene and at least one $C_4$ to $C_{10}$ α-olefin. Further, the present invention is directed to an article comprising said polypropylene composition (P) and the use of said polypropylene composition (P) as a sealing layer in a multi-layer film.

14 Claims, No Drawings

(56) References Cited

U.S. PATENT DOCUMENTS

| | | |
|---|---|---|
| 10,100,185 B2 | 10/2018 | Wang et al. |
| 10,100,186 B2 | 10/2018 | Wang et al. |
| 10,227,427 B2 | 3/2019 | Reichelt et al. |
| 10,414,135 B2 | 9/2019 | Fiebig et al. |
| 10,450,451 B2 | 10/2019 | Wang et al. |
| 10,519,259 B2 | 12/2019 | Resconi et al. |
| 10,647,788 B2 | 5/2020 | Chen et al. |
| 10,711,080 B2 | 7/2020 | Cavalieri et al. |
| 10,870,718 B2 | 12/2020 | Denifl et al. |
| 11,292,900 B2 | 4/2022 | Gahleitner et al. |
| 11,299,617 B2 | 4/2022 | Prieto et al. |
| 11,390,732 B2 | 7/2022 | Van Houcke et al. |
| 11,492,478 B2 | 11/2022 | Kniesel et al. |
| 11,504,949 B2 | 11/2022 | Oderkerk et al. |
| 11,518,863 B2 | 12/2022 | Vijay |
| 11,530,321 B2 | 12/2022 | Kniesel et al. |
| 11,827,777 B2 * | 11/2023 | Wang ............... C08F 4/65927 |
| 2003/0165703 A1 | 9/2003 | Pelliconi et al. |
| 2008/0207835 A1* | 8/2008 | Vestberg ............... C08L 23/16 |
| | | 525/240 |
| 2011/0152067 A1 | 6/2011 | Chen et al. |
| 2013/0203931 A1* | 8/2013 | Paavilainen ....... C09D 123/142 |
| | | 525/240 |
| 2014/0031492 A1 | 1/2014 | Reichelt et al. |
| 2016/0060371 A1* | 3/2016 | Boragno ............... C08F 4/6592 |
| | | 526/65 |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |
| 2016/0208085 A1 | 7/2016 | Gloger et al. |
| 2016/0229158 A1 | 8/2016 | Cavacas et al. |
| 2016/0237270 A1 | 8/2016 | Wang et al. |
| 2016/0244539 A1 | 8/2016 | Resconi et al. |
| 2016/0272740 A1 | 9/2016 | Wang et al. |
| 2016/0280899 A1 | 9/2016 | Töltsch et al. |
| 2016/0304681 A1 | 10/2016 | Potter et al. |
| 2016/0311951 A1 | 10/2016 | Reichelt et al. |
| 2016/0311988 A1 | 10/2016 | Potter et al. |
| 2016/0312018 A1 | 10/2016 | Vestberg et al. |
| 2016/0312019 A1 | 10/2016 | Lampela et al. |
| 2016/0347943 A1 | 12/2016 | Wang et al. |
| 2016/0347944 A1 | 12/2016 | Wang et al. |
| 2017/0009068 A1 | 1/2017 | Kahlen et al. |
| 2017/0029980 A1 | 2/2017 | Wang et al. |
| 2017/0137617 A1 | 5/2017 | Wang et al. |
| 2017/0166711 A1 | 6/2017 | Boragno et al. |
| 2017/0218172 A1 | 8/2017 | Wang et al. |
| 2017/0313867 A1 | 11/2017 | Lampela et al. |
| 2017/0321048 A1 | 11/2017 | Nummila-Pakarinen et al. |
| 2017/0335078 A1 | 11/2017 | Defoer et al. |
| 2018/0079875 A1 | 3/2018 | Braun et al. |
| 2018/0194881 A1 | 7/2018 | Denifl et al. |
| 2020/0263015 A1 | 8/2020 | Kniesel et al. |
| 2020/0270434 A1 | 8/2020 | Van Houcke et al. |
| 2020/0277479 A1 | 9/2020 | Jerabek et al. |
| 2020/0308353 A1 | 10/2020 | Jerabek et al. |
| 2020/0347216 A1 | 11/2020 | Kniesel et al. |
| 2020/0392321 A1 | 12/2020 | Gahleitner et al. |
| 2021/0114352 A1 | 4/2021 | Oderkerk et al. |
| 2021/0171749 A1 | 6/2021 | Kumar et al. |
| 2021/0171750 A1 | 6/2021 | Gahleitner et al. |
| 2021/0214527 A1 | 7/2021 | Gahleitner et al. |
| 2021/0214533 A1 | 7/2021 | Kulshreshtha et al. |
| 2021/0238376 A1 | 8/2021 | Kahlen et al. |
| 2021/0253836 A1 | 8/2021 | Gahleitner et al. |
| 2021/0269560 A1 | 9/2021 | Krallis et al. |
| 2021/0324189 A1 | 10/2021 | Prieto et al. |
| 2021/0332227 A1* | 10/2021 | Wang .................... C08L 23/30 |
| 2021/0347971 A1* | 11/2021 | Wang .................... C08F 2/001 |
| 2022/0033631 A1 | 2/2022 | Gloger et al. |
| 2022/0204719 A1 | 6/2022 | Vijay |
| 2022/0227965 A1 | 7/2022 | Ruemer et al. |
| 2022/0251256 A1 | 8/2022 | Wang et al. |
| 2022/0289955 A1 | 9/2022 | Kahlen et al. |
| 2022/0306844 A1 | 9/2022 | Kahlen et al. |
| 2022/0315716 A1 | 10/2022 | Prieto et al. |
| 2022/0356330 A1 | 11/2022 | Kahlen et al. |
| 2023/0046086 A1 | 2/2023 | Al-Haj Ali et al. |
| 2023/0047329 A1 | 2/2023 | Al-Haj Ali |

FOREIGN PATENT DOCUMENTS

| | | |
|---|---|---|
| CN | 102264527 A | 11/2011 |
| CN | 102395468 A | 3/2012 |
| CN | 102712186 A | 10/2012 |
| CN | 102858869 A | 1/2013 |
| CN | 103608174 A | 2/2014 |
| CN | 103781614 A | 5/2014 |
| CN | 107250177 A | 10/2017 |
| CN | 108290982 A | 7/2018 |
| CN | 112638960 A | 4/2021 |
| DE | 602008004558 | 2/2011 |
| EP | 0 129 368 A1 | 12/1981 |
| EP | 0 260 130 A1 | 3/1988 |
| EP | 0 423 101 A2 | 4/1991 |
| EP | 0 537 130 A1 | 4/1993 |
| EP | 0 887 379 A1 | 12/1998 |
| EP | 2 186 834 A1 | 5/2010 |
| EP | 2 386 603 A1 | 11/2011 |
| EP | 2 661 466 A1 | 11/2013 |
| EP | 3 064 548 A1 | 9/2016 |
| RU | 2269547 C2 | 2/2006 |
| RU | 2470947 C2 | 12/2012 |
| WO | WO 92/12182 A1 | 7/1992 |
| WO | WO 97/28170 A1 | 8/1997 |
| WO | WO 98/46616 A1 | 10/1998 |
| WO | WO 98/49208 A1 | 11/1998 |
| WO | WO 98/56831 A1 | 12/1998 |
| WO | WO 98/58976 A1 | 12/1998 |
| WO | WO 99/12981 A1 | 3/1999 |
| WO | WO 99/19335 A1 | 4/1999 |
| WO | WO 00/23509 A1 | 4/2000 |
| WO | WO 00/34341 A2 | 6/2000 |
| WO | WO 2010/072841 A1 | 7/2010 |
| WO | WO 2010/124753 A1 | 11/2010 |
| WO | WO 2011/090101 A1 | 7/2011 |
| WO | WO 2011/131639 A1 | 10/2011 |
| WO | 2012/093099 A1 | 7/2012 |
| WO | WO 2013/007650 A1 | 1/2013 |
| WO | WO 2015/011135 A1 | 1/2015 |
| WO | WO 2018/065242 A1 | 4/2018 |

OTHER PUBLICATIONS

Castignolles et al., "Detection and quantification of branching in polyacrylates by size-exclusion chromatography (SEC) and melt-state $^{13}$C NMR spectroscopy," *Polymer* 50(11): 2373-2383, (2009).

Filip et al., "Heteronuclear decoupling under fast MAS by a rotor-synchronized Hahn-echo pulse train,"*J. Magnet. Reson.* 176: 239-243 (2005).

Griffin et al., "Low-load rotor-synchronised Hahn-echo pulse train (RS-HEPT) 1H decoupling in solid-state NMR: factors affecting MAS spin-echo dephasing times," *Magn. Reson. Chem.* 45: S198-S208 (2007).

Jonsson, "Nomenclature for non-linear chromatography (IUPAC Recommendations 1996)," *Pure Appl. Chem.* 68(8): 1591-1595 (1996).

Klimke et al., "Optimisation and Application of Polyolefin Branch Quantification by Melt-State $^{13}$C NMR Spectroscopy," *Macromol. Chem. Phys.* 207(4): 382-395 (2006).

Liu et al., "Poly(ethylene-co-1-octene) Characterization by High-Temperature Multidimensional NMR at 750 MHZ," *Macromolecules* 34: 4757-4767 (2001).

Parkinson et al., "Effect of Branch Length on $^{13}$C NMR Relaxation Properties in Molten Poly[ethylene-co-(a-olefin)] Model Systems," *Macromol. Chem. Phys.* 208(19-20): 2128-2133 (2007).

*Plastics Additives Handbook*, 6th edition, Hans Zweifel, Editor, Hanser Publishers, Munich, pp. 1141-1190 (2009).

Pollard et al., "Observation of Chain Branching in Polyethylene in the Solid State and Melt via 13C NMR Spectroscopy and Melt NMR Relaxation Time Measurements," *Macromolecules* 37(3): 813-825 (2004).

(56) References Cited

OTHER PUBLICATIONS

Qiu et al., "Improved Peak Assignments for the 13C NMR Spectra of Poly(ethylene-co-1-octene)s," *Macromolecules* 40: 6879-6884 (2007).

Randall, "A Review of High Resolution Liquid $^{13}$Carbon Nuclear Magnetic Resonance Characterizations of Ethylene-Based Polymers," *JMS-Rev. Macromol. Chem. Phys. C29*(2 & 3): 201-317 (1989).

Resconi et al., "Selectivity in Propene Polymerization with Metallocene Catalysts," *Chem. Rev. 100*(4): 1253-1345 (2000).

European Patent Office, Extended European Search Report in European Patent Application No. 18 19 6812.4 (Feb. 26, 2019).

European Patent Office, International Search Report in International Application No. PCT/EP2019/071169 (Sep. 23, 2019).

European Patent Office, Written Opinion in International Application No. PCT/EP2019/071169 (Sep. 23, 2019).

International Bureau of WIPO, International Preliminary Report on Patentability in International Application No. PCT/EP2019/071169 (Mar. 23, 2021).

The Patent Office of the People's Republic of China, First Notification of Office Action issued in Chinese Patent Application No. 201980056582.6 (Feb. 8, 2023).

Wang et al., *Polymer Modification*, 2nd Edition, *China Light Industry Press*, pp. 55-56 (2008).

The Patent Office of the People's Republic of China, Second Notification of Office Action issued in Chinese Patent Application No. 201980056582.6 (Jul. 10, 2023).

Sutyagin et al., *Chemistry and Physics of Polymers*, Tomsk: TPU Publishing House, (2003), total 4 pages, including p. 142.

Chen, B.L., "Surface Properties of Corona Treated Polyethylene Films Containing N-2-Hydroxy Ethyl Erucamide as Slip Agent for Enhanced Adhesion of Water-Based Ink", *Rapra Abstracts*, vol. 35(8): pp. 119-120 (1998).

Yu, Thomas C., "Metallocene Plastomer Modification of Polypropylenes", *Polymer Engineering and Science*, vol. 41(4): pp. 656-671 (2001).

European Patent Office, Communication pursuant to Article 94(3) EPC issued in European Patent Application No. 19 752 170.1 (Sep. 29, 2023).

The Patent Office of the People's Republic of China, Third Notification of Office Action issued in Chinese Patent Application No. 201980056582.6 (Oct. 17, 2023).

The Patent Office of the People's Republic of China, Notification of Reexamination in Chinese Patent Application No. 201980056582.6 (Jun. 24, 2024).

Brazilian Patent Office, Technical Examination Report in Brazilian Patent Application No. BR112021003442-0 (Jul. 5, 2024).

\* cited by examiner

PROPYLENE COPOLYMER COMPOSITION WITH EXCELLENT OPTICAL AND MECHANICAL PROPERTIES

CROSS-REFERENCE TO RELATED APPLICATIONS

This application is the U.S. national phase of International Application No. PCT/EP2019/071169, filed on Aug. 7, 2019, which claims the benefit of European Patent Application No. 18196812.4, filed Sep. 26, 2018, the disclosures of which are incorporated herein by reference in their entireties for all purposes.

The present invention is directed to a polypropylene composition (P) comprising a copolymer (C) of propylene and 1-hexene comprising a first random propylene copolymer (A) of propylene and a 1-hexene, and a second random propylene copolymer (B) of propylene and 1-hexene having a higher 1-hexene content than the first random propylene copolymer (A) as well as a plastomer (PL) being an elastomeric copolymer of ethylene and at least one $C_4$ to $C_{10}$ α-olefin. Further, the present invention is directed to an article comprising said polypropylene composition (P) and the use of said polypropylene composition (P) as a sealing layer in a multi-layer films.

It is well known in the art that copolymers of propylene and higher α-olefines, particularly 1-hexene, prepared in the presence of metallocene catalysts are featured by an excellent sealing behavior. The sealing window of such propylene/1-hexene copolymers, i.e. the difference between the melting temperature (Tm) and the sealing initiation temperature (SIT), is significantly broader compared to the current solutions such as Ziegler-Natta based random copolymers having a high ethylene content or terpolymers of ethylene, propylene and butene. For instance, EP 2 386 603 A1 and WO 2011/131639 A1 describe propylene/1-hexene copolymers having a broad scaling window. Further, metallocene based propylene/1-hexene copolymers are also appreciated due to their excellent optical properties.

However, the toughness of propylene polymers prepared in the presence of metallocene catalysts is often not satisfying. Accordingly, there is a need in the art to combine the above mentioned benefits of metallocene based propylene/1-hexene copolymers with a good balance between stiffness and impact behavior.

Therefore, it is an object of the present invention to provide a metallocene based propylene polymer featured by an excellent impact strength while the stiffness remains on a high level. Good optical properties, especially haze before and after sterilization, are also highly appreciated.

Accordingly, the present invention is directed to a polypropylene composition (P), comprising
 a) 80.0 to 99.0 wt.-%, based on the overall weight of the polypropylene composition (P), of a copolymer (C) of propylene and 1-hexene, comprising
  i) a first random propylene copolymer (A) of propylene and a 1-hexene, and
  ii) a second random propylene copolymer (B) of propylene and 1-hexene having a higher 1-hexene content than the first random propylene copolymer (A), wherein the copolymer (C) has a xylene soluble content (XCS) of at least 8.0 wt.-%, and
 b) 1.0 to 20.0 wt.-%, based on the overall weight of the polypropylene composition (P), of a plastomer (PL) being an elastomeric copolymer of ethylene and at least one $C_4$ to $C_{10}$ α-olefin characterized by a density in the range of 0.860 to 0.930 g/cm³.

According to one embodiment of the present invention, the copolymer (C) has an amount of 2.1 erythro regio-defects of at least 0.4 mol.-%.

According to another embodiment of the present invention, the copolymer (C) has a melt flow rate $MFR_2$ (230° C., 2.16 kg) determined according to ISO 1133 in the range of 0.4 to 12.0 g/10 min.

According to a further embodiment of the present invention, the weight ratio between the first random propylene copolymer (A) and the second random propylene copolymer (B) within the copolymer (C) is in the range of 30:70 to 70:30.

According to still another embodiment of the present invention, the copolymer (C) fulfils in-equation (1)

$$MFR(C)/MFR(A) \leq 1.0 \qquad (1),$$

wherein MFR(A) is the melt flow rate $MFR_2$ (230° C., 2.16 kg) determined according to ISO 1133 in [g/10 min] of the first random propylene copolymer (A) and MFR(C) is the melt flow rate $MFR_2$ (230° C., 2.16 kg) determined according to ISO 1133 in [g/10 min] of the copolymer (C).

According to a further embodiment of the present invention, the copolymer (C) has a 1-hexene content of the xylene soluble fraction C6 (XCS) in the range of 2.0 to 8.0 wt.-%.

According to one embodiment of the present invention, the first random propylene copolymer (A) has a melt flow rate $MFR_2$ (230° C., 2.16 kg) determined according to ISO 1133 in the range of 0.3 to 12.0 g/10 min, and/or the second random propylene copolymer (B) has a melt flow rate $MFR_2$ (230° C., 2.16 kg) determined according to ISO 1133 in the range of 0.5 to 14.0 g/10 min.

According to a further embodiment of the present invention, the copolymer (C) fulfils in-equation (2)

$$4.5 \leq \frac{C6(C)}{C6(A) * \frac{[A]}{[C]}} \leq 9.0 \qquad (2)$$

wherein
 C6(A) is the 1-hexene content of the first random propylene copolymer (A) based on the total weight of the first random propylene copolymer (A) [in wt.-%];
 C6(C) is the 1-hexene content of the copolymer (C) based on the total weight of the copolymer (C) [in wt.-%]; and
 [A]/[C] is the weight ratio between the first random propylene copolymer (A) and the copolymer (C) [in g/g].

According to another embodiment of the present invention, the plastomer (PL) has a density in the range of 0.865 to 0.920 g/cm³.

It is especially preferred that the plastomer (PL) is a copolymer of ethylene and 1-octene.

The present invention is further directed to an article, comprising at least 90.0 wt.-% of the polypropylene composition (P) as defined above.

Preferably, the article is a film, more preferably a blown film.

Furthermore, it is preferred that the film has
 i) a haze before steam sterilization determined according to ASTM D 1003-00 measured on a 50 μm blown film below 10.0%, and
 ii) a haze after steam sterilization determined according to ASTM D 1003-00 measured on a 50 μm blown film below 12.0%.

The present invention is also directed to the use of the article as defined above as a sealing layer in a multi-layer film.

Further, the present invention is directed to a process for the preparation of the polypropylene composition (P) as described above, wherein the process is a sequential polymerization process comprising at least two reactors connected in series, wherein said process comprises the steps of
(A) polymerizing in a first reactor (R-1) being a slurry reactor (SR), preferably a loop reactor (LR), propylene and 1-hexene, obtaining a first random propylene copolymer (A),
(B) transferring said first random propylene copolymer (A) and unreacted comonomers of the first reactor (R-1) in a second reactor (R-2) being a gas phase reactor (GPR-1),
(C) feeding to said second reactor (R-2) propylene and 1-hexene,
(D) polymerizing in said second reactor (R-2) and in the presence of said first random propylene copolymer (A) propylene and 1-hexene obtaining a second random propylene copolymer (B), said first random propylene copolymer (A) and said second random propylene copolymer (B) form the copolymer (C), and
(E) blending the copolymer (C) with the plastomer (PL), thereby obtaining the polypropylene composition (P),
wherein further
in the first reactor (R-1) and second reactor (R-2) the polymerization takes place in the presence of a solid catalyst system (SCS), said solid catalyst system (SCS) comprises a transition metal compound of formula (I)

$R_n(Cp)_2MX_2$ (I)

wherein
each Cp independently is an unsubstituted or substituted and/or fused cyclopentadienyl ligand, substituted or unsubstituted indenyl or substituted or unsubstituted fluorenyl ligand; the optional one or more substituent(s) being independently selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —SiR"$_3$, —OSiR"$_3$, —SR", —PR"$_2$, OR" or —NR"$_2$,
each R" is independently a hydrogen or hydrocarbyl selected from C1-C20-alkyl, C2-C20-alkenyl, C2-C20-alkynyl, C3-C12-cycloalkyl or C6-C20-aryl; or in case of —NR"$_2$, the two substituents R" can form a five- or six-membered ring, together with the nitrogen atom to which they are attached;
R is a bridge of 1-2 C-atoms and 0-2 heteroatoms, wherein the heteroatom(s) can be Si, Ge and/or O atom(s), wherein each of the bridge atoms may bear independently substituents selected from C1-C20-alkyl, tri(C1-C20-alkyl)silyl, tri(C1-C20-alkyl)siloxy or C6-C20-aryl substituents); or a bridge of one or two heteroatoms selected from silicon, germanium and/or oxygen atom(s),
M is a transition metal of Group 4 selected from Zr or Hf, especially Zr;
each X is independently a sigma-ligand selected from H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"$_3$, —SiR"$_3$, —OSiR"$_3$, —NR"$_2$ or —CH$_2$—Y, wherein Y is C6-C20-aryl, C6-C20-heteroaryl, C1-C20-alkoxy, C6-C20-aryloxy, NR"$_2$, —SR", —PR"$_3$, —SiR"$_3$, or —OSiR"$_3$;
each of the above mentioned ring moieties alone or as a part of another moiety as the substituent for Cp, X, R" or R can further be substituted with C1-C20-alkyl which may contain Si and/or O atoms; and
n is 1 or 2.

It is especially preferred that the transition metal compound of formula (I) is an organo-zirconium compound of formula (II) or (II')

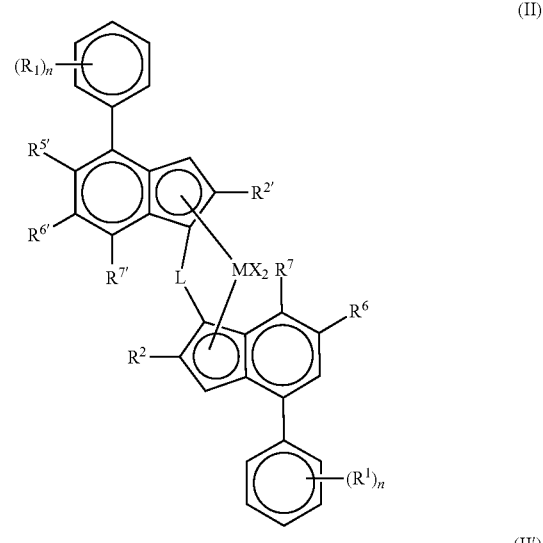

(II)

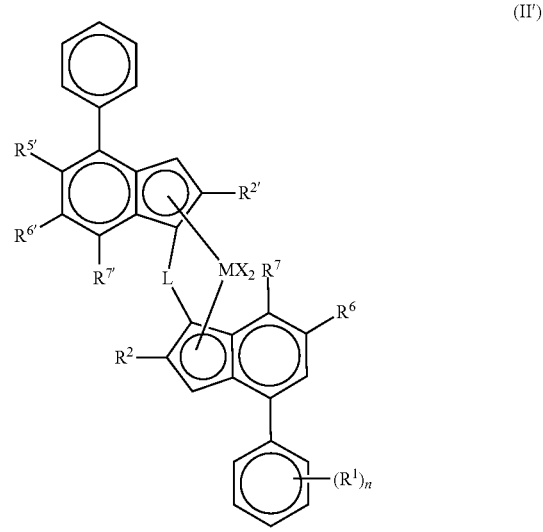

(II')

wherein
M is Zr;
each X is a sigma ligand, preferably each X is independently a hydrogen atom, a halogen atom, a C1-C6 alkoxy group, C1-C6 alkyl, a phenyl or a benzyl group;
L is a divalent bridge selected from —R'$_2$C—, —R'$_2$C—CR'$_2$, —R'$_2$Si—, —R'$_2$Si—SiR'$_2$—, —R'$_2$Ge—, wherein each R' is independently a hydrogen atom, C1-C20 alkyl, C3-C10 cycloalkyl, tri(C1-C20-alkyl) silyl, C6-C20-aryl or C7-C20 arylalkyl;
each $R^2$ or $R^{2'}$ is a C1-C10 alkyl group;
$R^{5'}$ is a C1-C10 alkyl group or a $Z'R^{3'}$ group;
$R^6$ is hydrogen or a C1-C10 alkyl group;

$R^{6'}$ is a C1-C10 alkyl group or a C6-C10 aryl group;
$R^7$ is hydrogen, a C1-C6 alkyl group or a $ZR^3$ group;
$R^{7'}$ is hydrogen or a C1-C10 alkyl group;
Z and Z' are independently O or S;
$R^{3'}$ is a C1-C10 alkyl group or a C6-C10 aryl group optionally substituted by one or more halogen groups;
$R^3$ is a C1-C10 alkyl group;
each n is independently 0 to 4;
and each $R^1$ is independently a C1-C20 hydrocarbyl group.

In the following, the present invention is described in more detail.

The Polypropylene Composition (P)

The polypropylene composition (P) according to the present invention comprises 80.0 to 99.0 wt.-% of a copolymer (C) of propylene and 1-hexene and 1.0 to 20.0 wt.-% of a plastomer (PL) being an elastomeric copolymer of ethylene and at least one $C_4$ to $C_{10}$ α-olefin, based on the overall weight of the polypropylene composition (P). Preferably, the polypropylene composition (P) comprises 82.0 to 98.0 wt.-%, more preferably 85.0 to 97.0 wt.-%, still more preferably 88.0 to 96.0 wt.-%, like 90.0 to 95.0 wt.-% of the copolymer (C) of propylene and 1-hexene and 2.0 to 18.0 wt.-%, more preferably 3.0 to 15.0 wt.-%, still more preferably 4.0 to 12.0 wt.-%, like 5.0 to 10.0 wt.-% of the plastomer (PL) being an elastomeric copolymer of ethylene and at least one $C_4$ to $C_{10}$ α-olefin, based on the overall weight of the polypropylene composition (P).

Further, the polypropylene composition (P) may contain additives (AD).

Accordingly, it is preferred that the polypropylene composition (P) comprises 77.0 to 97.99 wt.-%, more preferably 81.0 to 96.9 wt.-%, still more preferably 85.0 to 95.0 wt.-%, like 87.5 to 93.8 wt.-% of the copolymer (C) of propylene and 1-hexene, 2.0 to 18.0 wt.-%, more preferably 3.0 to 15.0 wt.-%, still more preferably 4.0 to 12.0 wt.-%, like 5.0 to 10.0 wt.-% of the plastomer (PL) being an elastomeric copolymer of ethylene and at least one $C_4$ to $C_{10}$ α-olefin and 0.01 to 5.0 wt.-%, more preferably 0.1 to 4.0 wt.-%, still more preferably 1.0 to 3.0 wt.-%, like 1.2 to 2.5 wt.-% of additives (AD), based on the overall weight of the polypropylene composition (P). The additives (AD) are defined in more detail below.

As mentioned above, it is appreciated that the polypropylene composition (P) is featured by excellent sealing properties. Accordingly a rather low heat sealing initiation temperature (SIT) and a broad sealing window are desired.

Accordingly it is preferred that the polypropylene composition (P) has a heat sealing initiation temperature (SIT) of equal or below 115° C., more preferably in the range of 90 to 112° C., still more preferably in the range of 95 to 110° C.

Not only shall the heat sealing initiation temperature (SIT) be rather low, but also the melting temperature (Tm) shall be rather high. Accordingly the difference between the melting temperature (Tm) and the heat sealing initiation temperature (SIT) shall be rather high. Thus it is preferred that the polypropylene composition (P) fulfills the equation (3), more preferably the equation (3a), yet more preferably the equation (3b)

$$Tm-SIT \geq 20° C. \quad (3)$$

$$Tm-SIT \geq 22° C. \quad (3a)$$

$$Tm-SIT \geq 25° C. \quad (3b)$$

wherein
Tm is the melting temperature given in centigrade [° C.] of the polypropylene composition (P),
SIT is the heat sealing initiation temperature given in centigrade [° C.] of the polypropylene composition (P).

The melting temperature (Tm) measured according to ISO 11357-3 of the polypropylene composition (P) is preferably at least 120° C., more preferably at least 125° C. Thus it is in particular appreciated that the melting temperature (Tm) measured according to ISO 11357-3 of the polypropylene composition (P) is in the range of 125 to 145° C., more preferably in the range of 130 to 140° C.

The polypropylene composition (P) is preferably obtained by a process being a sequential polymerization process comprising at least two reactors connected in series, wherein said process comprises the steps of (A) polymerizing in a first reactor (R-1) being a slurry reactor (SR), preferably a loop reactor (LR), propylene and 1-hexene, obtaining a first random propylene copolymer (A), (B) transferring said first random propylene copolymer (A) and unreacted comonomers of the first reactor (R-1) in a second reactor (R-2) being a gas phase reactor (GPR-1), (C) feeding to said second reactor (R-2) propylene and 1-hexene, (D) polymerizing in said second reactor (R-2) and in the presence of said first random propylene copolymer (A) propylene and 1-hexene obtaining a second random propylene copolymer (B), said first random propylene copolymer (A) and said second random propylene copolymer (B) form the copolymer (C), and (E) blending the copolymer (C) with the plastomer (PL) as defined in claims 1, 10 and 11, thereby obtaining the polypropylene composition (P), wherein further
in the first reactor (R-1) and second reactor (R-2) the polymerization takes place in the presence of a solid catalyst system (SCS).

The process for the preparation of the copolymer (C) and the solid catalyst system (SCS) are described in more detail below.

In the following, the copolymer (C) and the plastomer (PL) are described in more detail.

The Copolymer (C)

The copolymer (C) according to this invention is featured by a rather high comonomer content, i.e. 1-hexene content. The rather high comonomer content is achieved due to the fact that the inventive copolymer (C) comprises two fractions of propylene copolymer as defined herein. A "comonomer" according to this invention is a polymerizable unit different to propylene. Accordingly the copolymer (C) according to this invention shall have a 1-hexene content in the range of 2.0 to 8.0 wt.-%, more preferably in the range of 3.0 to 7.5 wt.-%, still more preferably in the range of 3.5 to 7.2 wt.-%, like in the range of 4.0 to 7.0 wt.-%.

The copolymer (C) comprises a first random propylene copolymer (A) and a second random propylene copolymer (B). The term "random copolymer" has to be preferably understood according to IUPAC (Pure Appl. Chem., Vol. No. 68, 8, pp. 1591 to 1595, 1996). Preferably the molar concentration of comonomer dyads, like 1-hexene dyads, obeys the relationship $$[HH]<[H]^2$$

wherein
[HH] is the molar fraction of adjacent comonomer units, like of adjacent 1-hexene units, and

[H] is the molar fraction of total comonomer units, like of total 1-hexene units, in the polymer.

Furthermore, it is preferred that the copolymer (C) of the present invention has a melt flow rate (MFR) given in a specific range. The melt flow rate measured under a load of 2.16 kg at 230° C. (ISO 1133) is denoted as $MFR_2$ (230° C., 2.16 kg). Accordingly, it is preferred that in the present invention the copolymer (C) has a melt flow rate $MFR_2$ (230° C., 2.16 kg) determined according to ISO 1133 in the range of 0.4 to 12.0 g/10 min, more preferably in the range of 0.6 to 9.0 g/10 min, still more preferably in the range of 0.8 to 6.0 g/10 min, like in the range of 1.0 to 3.5 g/10 min.

Additionally the copolymer (C) is defined by the xylene cold soluble (XCS) content measured according to ISO 16152 (25° C.). Accordingly the copolymer (C) is featured by a xylene cold soluble (XCS) content of at least 8.0 wt.-%, preferably in the range of 8.0 to 30.0 wt.-%, more preferably in the range of 10.0 to 28.0 wt.-%, like in the range of 10.0 to 26.0 wt.-%.

The amount of xylene cold soluble (XCS) additionally indicates that the copolymer (C) is preferably free of any elastomeric polymer component, like an ethylene propylene rubber. In other words the copolymer (C) shall not be a heterophasic polypropylene, i.e. a system consisting of a polypropylene matrix in which an elastomeric phase is dispersed. Such systems are featured by a rather high xylene cold soluble content. Accordingly in a preferred embodiment the copolymer (C) comprises the first random propylene copolymer (A) and the second random propylene copolymer (B) as the only polymer components.

Further, it is preferred that the copolymer (C) has a 1-hexene content of the xylene soluble fraction C6 (XCS) in the range of 2.0 to 15.0 wt.-%, more preferably in the range of 2.5 to 12.0 wt.-%, still more preferably in the range of 3.0 to 10.0 wt.-%.

Similar to xylene cold solubles (XCS) the hexane hot solubles (HHS) indicate that part of a polymer which has a low isotacticity and crystallinity and which is soluble in hexane at 50° C.

Accordingly it is preferred that the inventive copolymer (C) has an amount of hexane hot solubles (HHS) measured according to FDA 177.1520 equal or below 1.5 wt.-%, more preferably equal or below 1.2 wt.-%, still more preferably equal or below 1.0 wt.-%, like equal or below 0.8 wt.-%.

The copolymer (C) of the present invention is further defined by its polymer fractions present. Accordingly the copolymer (C) of the present invention comprises at least, preferably consists of, two fractions, namely the first random propylene copolymer (A) and the second random propylene copolymer (B).

The first random propylene copolymer (A) is a copolymer of propylene and a 1-hexene having al-hexene content in the range of 0.1 to 4.0 wt.-%, preferably in the range of 0.5 to 3.5 wt.-%, more preferably in the range of 0.8 to 3.0 wt.-%, still more preferably in the range of 1.0 to 2.5 wt.-%, and the second random propylene copolymer (B) is a copolymer of propylene and 1-hexene having an 1-hexene content in the range of 4.0 to 15.0 wt.-%, preferably in the range of 5.0 to 13.0 wt.-%, more preferably in the range of 6.0 to 12.0 wt.-%, still more preferably in the range of 6.5 to 10.0 wt.-%.

Accordingly, the first random propylene copolymer (A) is the 1-hexene lean fraction whereas the second random propylene copolymer (B) is the 1-hexene rich fraction.

With regard to the melt flow rate $MFR_2$, the copolymer (C) fulfils in-equation (1), more preferably in-equation (1a), still more preferably in-equation (1b), $$MFR(C)/MFR(A) \leq 1.0 \quad (1),$$

$$0.5 \leq MFR(C)/MFR(A) \leq 1.0 \quad (1a),$$

$$0.6 \leq MFR(C)/MFR(A) \leq 0.9 \quad (1b),$$

wherein MFR(A) is the melt flow rate $MFR_2$ (230° C., 2.16 kg) determined according to ISO 1133 in [g/10 min] of the first random propylene copolymer (A) and MFR(C) is the melt flow rate $MFR_2$ (230° C., 2.16 kg) determined according to ISO 1133 in [g/10 min] of the copolymer (C).

Further, it is appreciated that the first random propylene copolymer (A) has a melt flow rate $MFR_2$ (230° C., 2.16 kg) determined according to ISO 1133 in the range of 0.3 to 12.0 g/10 min, more preferably in the range of 0.5 to 9.0 g/10 min, still more preferably in the range of 0.7 to 6.0 g/10 min, like in the range of 1.0 to 3.0 g/10 min.

The second random propylene copolymer (B) preferably has a melt flow rate $MFR_2$ (230° C., 2.16 kg) determined according to ISO 1133 in the range of 0.5 to 14.0 g/10 min, more preferably in the range of 0.7 to 11.0 g/10 min, still more preferably in the range of 0.9 to 8.0 g/10 min, like in the range of 1.1 to 5.0 g/10 min.

Preferably the weight ratio between the first random propylene copolymer (A) and the second random propylene copolymer (B) within the copolymer (C) is in the range of 30:70 to 70:30, more preferably in the range of 35:65 to 65:35, still more preferably in the range of 40:60 to 60:40.

In particular, it is preferred that the copolymer (C) comprises 30.0 to 70.0 wt.-%, more preferably 35.0 to 50.0 wt.-%, still more preferably 38.0 to 45.0 wt.-%, like 39.0 wt.-% to 43.0 wt.-% of the first random propylene copolymer (A) and 30.0 to 70.0 wt.-%, more preferably 40.0 to 65.0 wt.-%, still more preferably 48.0 to 60.0 wt.-%, like 52.0 to 55.0 wt.-% of the second random propylene copolymer (B), based on the overall weight of the copolymer (C).

Further, it is preferred that the copolymer (C) has an amount of 2.1 erythro regio-defects of at least 0.4 mol-%. Without being bound to theory, a high amount of misinsertions of propylene and/or 1-hexene within the polymer chain indicates that the copolymer (C) is produced in the presence of a single site catalyst, preferably a metallocene catalyst.

The copolymer (C) is in particular obtainable, preferably obtained, by a process as defined in detail below.

The process for the preparation of a copolymer (C) forming the polypropylene composition (P) as defined above is a sequential polymerization process comprising at least two reactors connected in series, wherein said process comprises the steps of (A) polymerizing in a first reactor (R-1) being a slurry reactor (SR), preferably a loop reactor (LR), propylene and 1-hexene, preferably 1-hexene, obtaining a first random propylene copolymer (A) as defined in the instant invention, (B) transferring said first random propylene copolymer (A) and unreacted comonomers of the first reactor (R-1) in a second reactor (R-2) being a gas phase reactor (GPR-1), (C) feeding to said second reactor (R-2) propylene and 1-hexene, (D) polymerizing in said second reactor (R-2) and in the presence of said first random propylene copolymer (A) propylene and 1-hexene, obtaining a second random propylene copolymer (B) as defined in the instant invention, said first random propylene copolymer (A) and said second random propylene copolymer (B) form the copolymer (C) as defined in the instant invention, wherein further in the first reactor (R-1) and second reactor (R-2) the polymerization takes place in the presence of a solid catalyst system (SCS), said solid catalyst system (SCS) comprises (i) a transition metal compound of formula (I)

$$R_n(Cp)_2MX_2 \qquad (I)$$

wherein

"M" is zirconium (Zr) or hafnium (Hf), each "X" is independently a monovalent anionic α-ligand, each "Cp" is a cyclopentadienyl-type organic ligand independently selected from the group consisting of unsubstituted or substituted and/or fused cyclopentadienyl, substituted or unsubstituted indenyl or substituted or unsubstituted fluorenyl, said organic ligands coordinate to the transition metal (M), "R" is a bivalent bridging group linking said organic ligands (Cp), "n" is 1 or 2, preferably 1, and (ii) optionally a cocatalyst (Co) comprising an element (E) of group 13 of the periodic table (IUPAC), preferably a cocatalyst (Co) comprising a compound of Al and/or B.

Concerning the definition of the Copolymer (C), the first random propylene copolymer (A) and the second random propylene copolymer (B) it is referred to the definitions given above.

The solid catalyst system (SCS) is defined in more detail below.

Due to the use of the solid catalyst system (SCS) in a sequential polymerization process the manufacture of the above defined copolymer (C) is possible. In particular due to the preparation of a propylene copolymer, i.e. the first random propylene copolymer (A), in the first reactor (R-1) and the conveyance of said propylene copolymer and especially the conveyance of unreacted comonomers into the second reactor (R-2) it is possible to produce a copolymer (C) with high comonomer content in a sequential polymerization process. Normally the preparation of a propylene copolymer with high comonomer content in a sequential polymerization process leads to fouling or in severe cases to the blocking of the transfer lines as normally unreacted comonomers condensate at the transfer lines. However with the new method the conversion of the comonomers is increased and therewith a better incorporation into the polymer chain leading to higher comonomer content and reduced stickiness problems is achieved.

The term "sequential polymerization process" indicates that the copolymer (C) is produced in at least two reactors connected in series. More precisely the term "sequential polymerization process" indicates in the present application that the polymer of the first reactor (R-1) is directly conveyed with unreacted comonomers to the second reactor (R-2). Accordingly the decisive aspect of the present process is the preparation of the copolymer (C) in two different reactors, wherein the reaction material of the first reactor (R-1) is directly conveyed to the second reactor (R-2). Thus the present process comprises at least a first reactor (R-1) and a second reactor (R-2). In one specific embodiment the instant process consists of two polymerization reactors (R-1) and (R-2). The term "polymerization reactor" shall indicate that the main polymerization takes place there. Thus in case the process consists of two polymerization reactors, this definition does not exclude the option that the overall process comprises for instance a pre-polymerization step in a pre-polymerization reactor. The term "consists of" is only a closing formulation in view of the main polymerization reactors.

The first reactor (R-1) is a slurry reactor (SR) and can be any continuous or simple stirred batch tank reactor or loop reactor operating in slurry. According to the present invention the slurry reactor (SR) is preferably a loop reactor (LR).

The second reactor (R-2) and any subsequent reactors are gas phase reactors (GPR). Such gas phase reactors (GPR) can be any mechanically mixed or fluid bed reactors. Preferably the gas phase reactor(s) (GPR) comprise a mechanically agitated fluid bed reactor with gas velocities of at least 0.2 m/sec. Thus it is appreciated that the gas phase reactor (GPR) is a fluidized bed type reactor preferably with a mechanical stirrer.

The condition (temperature, pressure, reaction time, monomer feed) in each reactor is dependent on the desired product which is in the knowledge of a person skilled in the art. As already indicated above, the first reactor (R-1) is a slurry reactor (SR), like a loop reactor (LR), whereas the second reactor (R-2) is a gas phase reactor (GPR-1). The subsequent reactors—if present—are also gas phase reactors (GPR).

A preferred multistage process is a "loop-gas phase"-process, such as developed by *Borealis* A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379, and WO 98/58976. The contents of these documents are included herein by reference.

Preferably, in the instant process for producing the copolymer (C) as defined above the conditions for the first reactor (R-1), i.e. the slurry reactor (SR), like a loop reactor (LR), of step (A) may be as follows:

the temperature is within the range of 40° C. to 110° C., preferably between 60° C. and 100° C., more preferably in the range of 65 to 90° C., the pressure is within the range of 20 bar to 80 bar, preferably between 40 bar and 70 bar, hydrogen can be added for controlling the molar mass in a manner known per se.

Subsequently, the reaction mixture from step (A) is transferred to the second reactor (R-2), i.e. gas phase reactor (GPR-1), i.e. to step (D), whereby the conditions in step (D) are preferably as follows:

the temperature is within the range of 50° C. to 130° C., preferably between 60° C. and 100° C., the pressure is within the range of 5 bar to 50 bar, preferably between 15 bar to 40 bar, hydrogen can be added for controlling the molar mass in a manner known per se.

The residence time can vary in both reactor zones.

In one embodiment of the process for producing the copolymer (C) the residence time in the slurry reactor (SR), e.g. loop (LR) is in the range 0.2 to 4.0 hours, e.g. 0.3 to 1.5 hours and the residence time in the gas phase reactor (GPR) will generally be 0.2 to 6.0 hours, like 0.5 to 4.0 hours.

If desired, the polymerization may be effected in a known manner under supercritical conditions in the first reactor (R-1), i.e. in the slurry reactor (SR), like in the loop reactor (LR).

The conditions in the other gas phase reactors (GPR), if present, are similar to the second reactor (R-2).

The present process may also encompass a pre-polymerization prior to the polymerization in the first reactor (R-1). The pre-polymerization can be conducted in the first reactor (R-1), however it is preferred that the pre-polymerization takes place in a separate reactor, a so called pre-polymerization reactor.

The copolymer (C) according to the present invention is prepared in the presence of a solid catalyst system (SCS) comprising a transition metal compound.

The transition metal compound has the formula (I)

$$R_n(Cp)_2MX_2 \quad (I)$$

wherein each Cp independently is an unsubstituted or substituted and/or fused cyclopentadienyl ligand, e.g. substituted or unsubstituted cyclopentadienyl, substituted or unsubstituted indenyl or substituted or unsubstituted fluorenyl ligand; the optional one or more substituent(s) being independently selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —SiR"$_3$, —OSiR"$_3$, —SR", —PR"$_2$, OR" or —NR"$_2$, each R" is independently a hydrogen or hydrocarbyl, e.g. C1-C20-alkyl, C2-C20-alkenyl, C2-C20-alkynyl, C3-C12-cycloalkyl or C6-C20-aryl; or e.g. in case of —NR"$_2$, the two substituents R" can form a ring, e.g. five- or six-membered ring, together with the nitrogen atom to which they are attached;

R is a bridge of 1-3 atoms, e.g. a bridge of 1-2 C-atoms and 0-2 heteroatoms, wherein the heteroatom(s) can be e.g. Si, Ge and/or O atom(s), wherein each of the bridge atoms may bear independently substituents, such as C1-C20-alkyl, tri(C1-C20-alkyl)silyl, tri(C1-C20-alkyl)siloxy or C6-C20-aryl substituents); or a bridge of 1-3, e.g. one or two, hetero atoms, such as silicon, germanium and/or oxygen atom(s), e.g. —SiR$^{10}$$_2$, wherein each R$^{10}$ is independently C1-C20-alkyl, C3-12 cycloalkyl, C6-C20-aryl or tri(C1-C20-alkyl) silyl-residue, such as trimethylsilyl;

M is a transition metal of Group 4, e.g. Zr or Hf, especially Zr;

each X is independently a sigma-ligand, such as H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"$_3$, —SiR"$_3$, —OSiR"$_3$, —NR"$_2$ or —CH$_2$—Y, wherein Y is C6-C20-aryl, C6-C20-heteroaryl, C1-C20-alkoxy, C6-C20-aryloxy, NR"$_2$, —SR", —PR"$_3$, —SiR"$_3$, or —OSiR"$_3$;

each of the above mentioned ring moieties alone or as a part of another moiety as the substituent for Cp, X, R" or R can further be substituted e.g. with C1-C20-alkyl which may contain Si and/or O atoms;

n is 1 or 2.

Suitably, in each X as —CH$_2$—Y, each Y is independently selected from C6-C20-aryl, NR"$_2$, —SiR"$_3$ or —OSiR"$_3$. Most preferably, X as —CH$_2$—Y is benzyl. Each X other than —CH$_2$—Y is independently halogen, C1-C20-alkyl, C1-C20-alkoxy, C6-C20-aryl, C7-C20-arylalkenyl or —NR"$_2$ as defined above, e.g. —N(C1-C20-alkyl)$_2$.

Preferably, each X is halogen, methyl, phenyl or —CH$_2$—Y, and each Y is independently as defined above.

Cp is preferably cyclopentadienyl, indenyl or fluorenyl, optionally substituted as defined above. Ideally Cp is cyclopentadienyl or indenyl.

In a suitable subgroup of the compounds of formula (I), each Cp independently bears 1, 2, 3 or 4 substituents as defined above, preferably 1, 2 or 3, such as 1 or 2 substituents, which are preferably selected from C1-C20-alkyl, C6-C20-aryl, C7-C20-arylalkyl (wherein the aryl ring alone or as a part of a further moiety may further be substituted as indicated above), —OSiR"$_3$, wherein R" is as indicated above, preferably C1-C20-alkyl.

R, is preferably a methylene, ethylene or a silyl bridge, whereby the silyl can be substituted as defined above, e.g. a (dimethyl)Si=, (methylphenyl)Si=, (methylcyclohexyl) silyl= or (trimethylsilylmethyl)Si=; n is 0 or 1. Preferably, R" is other than hydrogen.

A specific subgroup includes the well known metallocenes of Zr and Hf with two eta5-ligands which are bridged with cyclopentadienyl ligands optionally-substituted with e.g. siloxy, or alkyl (e.g. C1-6-alkyl) as defined above, or with two bridged indenyl ligands optionally substituted in any of the ring moieties with e.g. siloxy or alkyl as defined above, e.g. at 2-, 3-, 4- and/or 7-positions. Preferred bridges are ethylene or —SiMe$_2$.

The preparation of the metallocenes can be carried out according or analogously to the methods known from the literature and is within skills of a person skilled in the field. Thus for the preparation see e.g. EP-A-129 368, examples of compounds wherein the metal atom bears a —NR"$_2$ ligand see i.a. in WO-A-985683 1 and WO-A-0034341. For the preparation see also e.g. in EP-A-260 130. WO-A-9728170, WO-A-9846616, WO-A-9849208, WO-A-9912981, WO-A-9919335, WO-A-9856831, WO-A-00 34341, EP-A-423 101 and EP-A-537 130.

The complexes of the invention are preferably asymmetrical. That means simply that the two indenyl ligands forming the metallocene are different, that is, each indenyl ligand bears a set of substituents that are either chemically different, or located in different positions with respect to the other indenyl ligand. More precisely, they are chiral, racemic bridged bisindenyl metallocenes. Whilst the complexes of the invention may be in their syn configuration ideally, they are in their anti configuration. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane.

Preferred complexes of the invention are of formula (II') or (II)

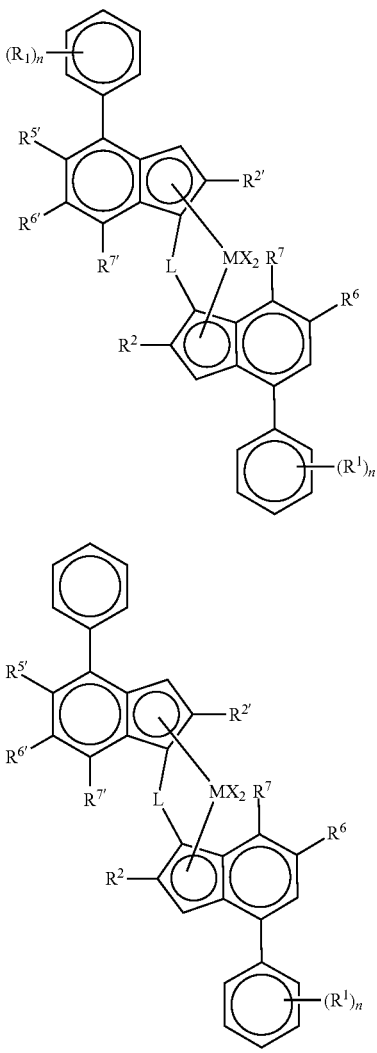

wherein
M is Zr;
each X is a sigma ligand, preferably each X is independently a hydrogen atom, a halogen atom, a C1-C6 alkoxy group, C1-C6 alkyl, a phenyl or a benzyl group;
L is a divalent bridge selected from —R'$_2$C—, —R'$_2$C—CR'$_2$, —R'$_2$Si—, —R'$_2$Si—SiR'$_2$—, —R'$_2$Ge—, wherein each R' is independently a hydrogen atom, C1-C20 alkyl, C3-C10 cycloalkyl, tri(C1-C20-alkyl) silyl, C6-C20-aryl, C7-C20 arylalkyl
each $R^2$ or $R^{2'}$ is a C1-C10 alkyl group;
$R^{5'}$ is a C1-C10 alkyl group or a Z'$R^{3'}$ group;
$R^6$ is hydrogen or a C1-C10 alkyl group;
$R^{6'}$ is a C1-C10 alkyl group or a C6-C10 aryl group;
$R^7$ is hydrogen, a C1-C6 alkyl group or a Z$R^3$ group;
$R^{7'}$ is hydrogen or a C1-C10 alkyl group;
Z and Z' are independently O or S;
$R^{3'}$ is a C1-C10 alkyl group, or a C6-C10 aryl group optionally substituted by one or more halogen groups;
$R^3$ is a C1-C10 alkyl group;
each n is independently 0 to 4, e.g. 0, 1 or 2;
and each $R^1$ is independently a C1-C20 hydrocarbyl group, e.g. a C1-C10 alkyl group.
Particularly preferred compounds of the invention include:
rac-dimethylsilanediylbis[2-methyl-4-(4-tert-butylphenyl)-1,5,6,7-tetrahydro-s-indacen-1-yl] zirconium dichloride
rac-dimethylsilanediylbis(2-methyl-4-phenyl-5-methoxy-6-tert-butylinden-1-yl) zirconium dichloride
rac-anti-Me$_2$Si(2-Me-4-Ph-6-tBu-Ind)(2-Me-4-Ph-5-OMe-6-tBu-Ind)ZrCl$_2$
rac-anti-Me$_2$Si(2-Me-4-(p-tBuPh)-Ind)(2-Me-4-Ph-5-OMe-6-tBu-Ind)ZrCl$_2$
rac-anti-Me$_2$Si(2-Me-4-(3,5-di-tBuPh)-6-tBu-Ind)(2-Me-4-Ph-5-OMe-6-tBu-Ind)ZrCl$_2$
rac-anti-Me$_2$Si(2-Me-4-(p-tBuPh)-Ind)(2-Me-4-Ph-5-OC$_6$F$_5$)-6-iPr-Ind)ZrCl$_2$
rac-anti-Me(CyHex)Si(2-Me-4-Ph-6-tBu-Ind)(2-Me-4-Ph-5-OMe-6-tBu-Ind)ZrCl$_2$
rac-anti-Me$_2$Si(2-Me-4-(3,5-di-tBuPh)-7-Me-Ind)(2-Me-4-Ph-5-OMe-6-tBu-Ind)ZrCl$_2$
rac-anti-Me$_2$Si(2-Me-4-(3,5-di-tBuPh)-7-OMe-Ind)(2-Me-4-Ph-5-OMe-6-tBu-Ind)ZrCl$_2$
rac-anti-Me$_2$Si(2-Me-4-(p-tBuPh)-6-tBu-Ind)(2-Me-4-Ph-5-OMe-6-tBu-Ind)ZrCl$_2$
rac-anti-Me$_2$Si(2-Me-4-(p-tBuPh)-Ind)(2-Me-4-(4-tBuPh)-5-OMe-6-tBu-Ind)ZrCl$_2$
rac-anti-Me$_2$Si(2-Me-4-(p-tBuPh)-Ind)(2-Me-4-(3,5-tBu2Ph)-5-OMe-6-tBu-Ind)ZrCl$_2$
rac-anti-Me$_2$Si(2-Me-4-(p-tBuPh)-Ind)(2-Me-4-Ph-5-OtBu-6-tBu-Ind)ZrCl$_2$.

The most preferred metallocene complex (procatalyst) is rac-anti-dimethylsilandiyl(2-methyl-4-phenyl-5-methoxy-6-tert-butyl-indenyl)(2-methyl-4-(4-tert-butylphenyl)indenyl)zirconium dichloride.

Besides the metallocene complex (procatalyst), the metallocene catalyst comprises additionally a cocatalyst as defined in WO 2015/011135 A1. Accordingly the preferred cocatalyst is methylaluminoxane (MAO) and/or a borate, preferably trityl tetrakis(pentafluorophenyl)borate.

It is especially preferred that the metallocene catalyst is unsupported, i.e. no external carrier is used. Regarding the preparation of such a metallocene complex again reference is made to WO 2015/011135 A1.

The Plastomer (PL)

The polypropylene composition (P) according to the present invention further comprises a plastomer (PL) being an elastomeric copolymer of ethylene and at least one C$_4$ to C$_{10}$ α-olefin.

Preferably, the plastomer (PL) is a very low density polyolefin, more preferably a very low density polyolefin polymerized using single site catalysis.

The plastomer (PL) has a density in the range of 0.860 to 0.930 g/cm$^3$. Preferably, the density of the plastomer (PL) is in the range of 0.865 to 0.920 g/cm$^3$, more preferably in the range of 0.868 to 0.910 g/cm$^3$.

Preferably, the plastomer (PL) has a melt flow rate MFR$_2$ (190° C., 2.16 kg) in the range of 0.1 to 40.0 g/10 min, more preferably in the range of 0.3 to 35.0 g/10 min, still more preferably in the range of 0.4 to 32.0 g/10 min, like in the range of 0.5 to 30.0 g/10.0 min.

Preferably, the plastomer (PL) comprises units derived from ethylene and a C$_4$ to C$_{10}$ α-olefin.

The plastomer (PL) comprises, preferably consists of, units derivable from (i) ethylene and (ii) at least another C$_4$ to C$_{10}$ α-olefin, more preferably units derivable from (i) ethylene and (ii) at least another α-olefin selected form the group consisting of 1-butene, 1-pentene, 1-hexene, 1-heptene and 1-octene. It is especially preferred that the plastomer (PL) comprises at least units derivable from (i) ethylene and (ii) 1-butene or 1-octene.

In an especially preferred embodiment, the plastomer (PL) consists of units derivable from (i) ethylene and (ii) 1-butene or 1-octene. In particular, it is preferred that the plastomer (PL) is a copolymer of ethylene and 1-octene.

The ethylene content of the plastomer (PL) is in the range of 60.0 to 95.0 wt.-%, preferably in the range of 65.0 to 90.0 wt.-%, more preferably in the range of 70.0 to 85.0 wt.-%.

Additionally it is preferred that the plastomer (PL) has a melting temperature Tm of below 100° C., more preferably in the range of 50° C. to 90° C., still more preferably in the range of 55° C. to 85° C.

Alternatively or additionally to the previous paragraph it is preferred that the plastomer (PL) has a glass transition temperature of below −25° C., more preferably in the range of −65° C. to −30° C., still more preferably in the range of −60° C. to −35° C.

In one preferred embodiment the plastomer (PL) is prepared with at least one single-site catalyst. The plastomer (PL) may also be prepared with more than one single-site catalyst or may be a blend of multiple plastomers prepared with different single-site catalysts. In some embodiments, the plastomer (PL) is a substantially linear ethylene polymer (SLEP). SLEPs and other single-site catalyzed plastomers (PL) are known in the art, for example, U.S. Pat. No. 5,272,236. These resins are also commercially available, for example, as Queo™ plastomers available from Borealis, ENGAGE™ plastomer resins available from Dow Chemical Co., EXACT™ polymers from Exxon or TAFMER™ polymers from Mitsui, Lucene polymers from LG, Fortify polymers from Sabic or Solumer polymers from SK Chemicals.

According to step (E) of the inventive process, the plastomer (PL) is blended with the copolymer (C) in order to obtain the polypropylene composition (P). Preferably, the plastomer (PL) is blended with the copolymer (C) by means of melt blending. It is particularly preferred that the plastomer (PL) is melt blended with the copolymer (C) in an extruder, more preferably in a co-rotating twin-screw extruder.

The Additives (AD)

As indicated above, the polypropylene composition (P) may contain additives (AD).

Typical additives are acid scavengers, antioxidants, colorants, light stabilisers, plasticizers, slip agents, anti-scratch agents, dispersing agents, processing aids, lubricants, pigments, and the like.

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the polypropylene composition (P) of the invention does not comprise (a) further polymer(s) different to the first random propylene copolymer (A) and the second random propylene copolymer (B) forming the copolymer (C) and the plastomer (PL) in an amount exceeding 15 wt.-%, preferably in an amount exceeding 10 wt.-%, more preferably in an amount exceeding 9 wt.-%, based on the weight of the polypropylene composition (P). Any polymer being a carrier material for additives (AD) is not calculated to the amount of polymeric compounds as indicated in the present invention, but to the amount of the respective additive.

The polymeric carrier material of the additives (AD) is a carrier polymer to ensure a uniform distribution in the polypropylene composition (P) of the invention. The polymeric carrier material is not limited to a particular polymer. The polymeric carrier material may beethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer. It is preferred that the polymeric carrier material does not contain monomeric units derivable from styrene or derivatives thereof The Article The present invention is further directed to an article comprising at least 90.0 wt.-% of the polypropylene composition (P) as defined above.

Preferably, the article comprises at least 95.0 wt.-% of the polypropylene composition (P), more preferably at least 97.0 wt.-%, still more preferably at least 98.0 wt.-%, like at least 99.9 wt.-%. It is especially preferred that the article consists of the polypropylene composition (P).

It is preferred that the article is a film, more preferably a blown film. The film according to this invention can be obtained in a conventional manner for instance by cast film technology or extrusion blown film technology. Said film will typically have a thickness in the range of 15 to 300 μm, preferably in the range of 20 to 250 μm, like in the range of 30 to 200 μm.

Preferably, the film has a haze before steam sterilization determined according to ASTM D 1003-00 measured on a 50 μm blown film below 10.0%, more preferably below 8.0%, still more preferably below 7.5%, like below 6.5%, and a haze after steam sterilization determined according to ASTM D 1003-00 measured on a 50 μm blown film below 12.0%, more preferably below 10.0%, still more preferably below 9.0%, like below 8.5%.

Further, it is preferred that the film has a tensile modulus determined according to ISO 527-3 on 50 μm films in machine direction (MD) and/or transverse direction (TD) of at least 300 MPa, more preferably in the range of 350 to 1000 MPa, still more preferably in the range of 400 to 800 MPa, like in the range of 450 to 700 MPa.

Additionally, it is preferred that the film has a dart-drop strength (DDI) determined according to ASTM D1709, method A on a 50 μm blown film of at least 200 g, more preferably of at least 250 g, still more preferably of at least 300 g. The upper limit of said method is 1700 g.

It is further preferred that the film is characterized by a hot-tack force of more than 2.0 N, more preferably of more than 2.5 N.

Use

The present invention is also directed to the use of the article, preferably the film according to the present invention comprising the polypropylene composition (P) as a sealing layer in a multi-layer film.

Such multi-layer films are usually prepared by means of multi-layer blown film co-extrusion. The co-extrusion process may be carried out using conventional blown film techniques. Hence, the polypropylene composition (P) obtained from the above defined polymerization process is fed, typically in the form of pellets, optionally containing additives, to an extruding device forming part of a multi-layer blown film unit. From the extruder the polymer melt is passed preferably through a distributor to an annular die of said blown film unit, forming one of the outermost layers of a multi-layer film produced. Further layers of said multi-layer film may include other types of polypropylene or polyethylene homo- and copolymers.

In the following, the present invention is described by way of examples.

EXAMPLES

A. Measuring methods

The following definitions of terms and determination methods apply for the above general description of the invention as well as to the below examples unless otherwise defined.

Comonomer Content of 1-Hexene for a Propylene 1-Hexene Copolymer

Quantitative $^{13}\text{C}\{^{1}\text{H}\}$ NMR spectra recorded in the molten-state using a Bruker Avance III 500 NMR spectrometer operating at 500.13 and 125.76 MHz for $^{1}\text{H}$ and $^{13}\text{C}$ respectively. All spectra were recorded using a $^{13}\text{C}$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382., Parkinson, M., Klimke, K., Spiess, H. W., Wilhelm, M., Macromol. Chem. Phys. 2007; 208:2128., Castignolles, P., Graf, R., Parkinson, M., Wilhelm, M., Gaborieau, M., Polymer 50 (2009) 2373). Standard single-pulse excitation was employed utilising the NOE at short recycle delays of 3s (Klimke, K., Parkinson, M., Piel, C., Kaminsky, W., Spiess, H. W., Wilhelm, M., Macromol. Chem. Phys. 2006; 207: 382., Pollard, M., Klimke, K., Graf, R., Spiess, H. W., Wilhelm, M., Sperber, O., Piel, C., Kaminsky, W., Macromolecules 2004; 37:813.). and the RS-HEPT decoupling scheme (Filip, X., Tripon, C., Filip, C., J. Mag. Resn. 2005, 176, 239., Griffin, J. M., Tripon, C., Samoson, A., Filip, C., and Brown, S. P., Mag. Res. in Chem. 2007 45, S1, S198). A total of 16384 (16k) transients were acquired per spectra.

Quantitative $^{13}\text{C}\{^{1}\text{H}\}$ NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$$H = I\alpha B4/2$$

The amount of 1-hexene incorporated in PHHP double consecutive sequences was quantified using the integral of the ααB4 site at 41.7 ppm accounting for the number of reporting sites per comonomer:

$$HH = 2*I\alpha\alpha B4$$

When double consecutive incorporation was observed the amount of 1-hexene incorporated in PHP isolated sequences needed to be compensated due to the overlap of the signals αB4 and αB4B4 at 44.4 ppm:

$$H = (I\alpha B4 - 2*I\alpha\alpha B4)/2$$

The total 1-hexene content was calculated based on the sum of isolated and consecutively incorporated 1-hexene:

$$H\text{total} = H + HH$$

When no sites indicative of consecutive incorporation observed the total 1-hexeen comonomer content was calculated solely on this quantity:

$$H\text{total} = H$$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the αα21e9 methylene site at 42.4 ppm:

$$P21 = I\alpha\alpha 21e9$$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$$P12 = I_S\alpha\alpha + 2*P21 + H + HH/2$$

The total amount of propene was quantified as the sum of primary (1,2) and secondary (2,1-erythro) inserted propene:

$$P\text{total} = P12 + P21 = I_S\alpha\alpha + 3*I\alpha\alpha 21e9 + (I\alpha B4 - 2*I\alpha\alpha B4)/2 + I\alpha\alpha B4$$

This simplifies to:

$$P\text{total} = I_S\alpha\alpha + 3*I\alpha\alpha 21e9 + 0.5*I\alpha B4$$

The total mole fraction of 1-hexene in the polymer was then calculated as:

$$fH = H\text{total}/(H\text{total} + P\text{total})$$

The full integral equation for the mole fraction of 1-hexene in the polymer was:

$$fH = (((I\alpha B4 - 2*I\alpha\alpha B4)/2) + (2*I\alpha\alpha B4))/((I_S\alpha\alpha + 3*I\alpha\alpha 21e9 + 0.5*I\alpha B4) + ((I\alpha B4 - 2*I\alpha\alpha B4)/2) + (2*I\alpha\alpha 1B4))$$

This simplifies to:

$$fH = (I\alpha B4/2 + I\alpha\alpha B4)/(I_S\alpha\alpha + 3*I\alpha\alpha 21e9 + I\alpha B4 + I\alpha\alpha B4)$$

The total comonomer incorporation of 1-hexene in mole percent was calculated from the mole fraction in the usual manner:

$$H[\text{mol \%}] = 100*fH$$

The total comonomer incorporation of 1-hexene in weight percent was calculated from the mole fraction in the standard manner:

$$H[\text{wt \%}] = 100*(fH*84.16)/((fH*84.16) + ((1-fH)*42.08))$$

Calculation of comonomer content of the second random propylene copolymer (B):

$$\frac{C(CPP) - w(A) \times C(A)}{w(B)} = C(B)$$

wherein
w(A) is the weight fraction of the first random propylene copolymer (A),
w(B) is the weight fraction of the second random propylene copolymer (B), C(A) is the comonomer content [in wt.-%] measured by $^{13}C$ NMR spectroscopy of the first random propylene copolymer (A), i.e. of the product of the first reactor (R1), C(CPP) is the comonomer content [in wt.-%] measured by $^{13}C$ NMR spectroscopy of the product obtained in the second reactor (R2), i.e. the mixture of the first random propylene copolymer (A) and the second random propylene copolymer (B) [of the propylene copolymer (C-PP)], C(B) is the calculated comonomer content [in wt.-%] of the second random propylene copolymer (B).

Comonomer Content of 1-Octene of a Linear Low Density Polyethylene Plastomer (PL)

Quantitative nuclear-magnetic resonance (NMR) spectroscopy was used to quantify the comonomer content of the polymers.

Quantitative $^{13}C\{^{1}H\}$ NMR spectra recorded in the molten-state using a Bruker Avance III 500 NMR spectrometer operating at 500.13 and 125.76 MHz for $^{1}H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification (Klimke, K., Parkinson, M., Piel, C., Kaminsky, W., Spiess, H. W., Wilhelm, M., Macromol. Chem. Phys. 2006; 207:382.; Parkinson, M., Klimke, K., Spiess, H. W., Wilhelm, M., Macromol. Chem. Phys. 2007; 208:2128.; Castignolles, P., Graf, R., Parkinson, M., Wilhelm, M., Gaborieau, M., Polymer 50 (2009) 2373; NMR Spectroscopy of Polymers: Innovative Strategies for Complex Macromolecules, Chapter 24, 401 (2011)). Standard single-pulse excitation was employed utilising the transient NOE at short recycle delays of 3s (Pollard, M., Klimke, K., Graf, R., Spiess, H. W., Wilhelm, M., Sperber, O., Piel, C., Kaminsky, W., Macromolecules 2004; 37:813.; Klimke, K., Parkinson, M., Piel, C., Kaminsky, W., Spiess, H. W., Wilhelm, M., Macromol. Chem. Phys. 2006; 207:382.) and the RS-HEPT decoupling scheme (Filip, X., Tripon, C., Filip, C., J. Mag. Resn. 2005, 176, 239.; Griffin, J. M., Tripon, C., Samoson, A., Filip, C., and Brown, S. P., Mag. Res. in Chem. 2007 45, S1, S198). A total of 1024 (1k) transients were acquired per spectrum. This setup was chosen due its high sensitivity towards low comonomer contents.

Quantitative $^{13}C\{^{1}H\}$ NMR spectra were processed, integrated and quantitative properties determined using custom spectral analysis automation programs. All chemical shifts are internally referenced to the bulk methylene signal (δ+) at 30.00 ppm (J. Randall, Macromol. Sci., Rev. Macromol. Chem. Phys. 1989, C29, 201.).

Characteristic signals corresponding to the incorporation of 1-octene were observed (J. Randall, Macromol. Sci., Rev. Macromol. Chem. Phys. 1989, C29, 201.; Liu, W., Rinaldi, P., McIntosh, L., Quirk, P., Macromolecules 2001, 34, 4757; Qiu, X., Redwine, D., Gobbi, G., Nuamthanom, A., Rinaldi, P., Macromolecules 2007, 40, 6879) and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.37 ppm. This integral is assigned to the unresolved signals corresponding to both $*B6$ and $*\beta B6B6$ sites of isolated (EEOEE) and isolated double non-consecutive (EEOEOEE) 1-octene sequences respectively. To compensate for the influence of the two $*\beta B6B6$ sites the integral of the $\beta\beta B6B6$ site at 24.7 ppm is used:

$$O = I_{*B6+*\beta B6B6} - 2*I_{\beta\beta B6B6}$$

Characteristic signals resulting from consecutive 1-octene incorporation, i.e. EEOOEE comonomer sequences, were also observed. Such consecutive 1-octene incorporation was quantified using the integral of the signal at 40.57 ppm assigned to the $\alpha\alpha B6B6$ sites accounting for the number of reporting sites per comonomer:

$$OO = 2*I_{\alpha\alpha B6B6}$$

Characteristic signals resulting from isolated non-consecutive 1-octene incorporation, i.e. EEOEOEE comonomer sequences, were also observed. Such isolated non-consecutive 1-octene incorporation was quantified using the integral of the signal at 24.7 ppm assigned to the $\beta\beta B6B6$ sites accounting for the number of reporting sites per comonomer:

$$OEO = 2*I_{\beta\beta B6B6}$$

Characteristic signals resulting from isolated triple-consecutive 1-octene incorporation, i.e. EEOOOEE comonomer sequences, were also observed. Such isolated triple-consecutive 1-octene incorporation was quantified using the integral of the signal at 41.2 ppm assigned to the $\alpha\alpha\gamma B6B6B6$ sites accounting for the number of reporting sites per comonomer:

$$OOO = 3/2*I_{\alpha\alpha\gamma B6B6B6}$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$$O_{total} = O + OO + OEO + OOO$$

Characteristic signals resulting from saturated end-groups were observed. Such saturated end-groups were quantified using the average integral of the two resolved signals at 22.84 and 32.23 ppm. The 22.84 ppm integral is assigned to the unresolved signals corresponding to both 2B6 and 2S sites of 1-octene and the saturated chain end respectively. The 32.23 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S = (1/2)*(I_{2S+2B6} + I_{3S+3B6} - 2*O_{total})$$

The ethylene comonomer content was quantified using the integral of the bulk methylene (bulk) signals at 30.00 ppm. This integral included the γ and 4B6 sites from 1-octene as well as the $\delta^+$ sites. The total ethylene comonomer content was calculated based on the bulk integral and compensating for the observed 1-octene sequences and end-groups:

$$E_{total} = (1/2)*[I_{bulk} + 2*O + 1*OO + 3*OEO + 0*OOO + 3*S]$$

It should be noted that compensation of the bulk integral for the presence of isolated triple-incorporation (EEOOOEE) 1-octene sequences is not required as the number of under and over accounted ethylene units is equal.

The total mole fraction of 1-octene in the polymer was then calculated as:

$$fO = (O_{total}/(E_{total} + O_{total}))$$

The total comonomer incorporation of 1-octene in mol percent was calculated from the mole fraction in the standard manner:

$$O[\text{mol \%}] = 100 * fO$$

The mole percent ethylene incorporation was calculated from the formula:

$$E[\text{mol \%}] = 100 - O[\text{mol \%}].$$

Melt Flow Rate (MFR)

The melt flow rates $MFR_2$ are measured with a load of 2.16 kg at 230° C. for propylene copolymers and with a load of 2.16 kg at 190° C. for ethylene copolymers. The melt flow rate is that quantity of polymer in grams which the test apparatus standardised to ISO 1133 extrudes within 10 minutes at a temperature of 230° C., respectively 190° C. under a load of 2.16 kg.

Calculation of melt flow rate $MFR_2$ (230° C., 2.16 kg) of the second random propylene copolymer (B):

$$MFR(B) = 10^{\left[\frac{\log(MFR(C)) - w(A) \times \log(MFR(A))}{w(B)}\right]}$$

wherein
w(A) is the weight fraction of the first random propylene copolymer (A),
w(B) is the weight fraction of the second random propylene copolymer (B),
MFR(A) is the melt flow rate $MFR_2$ (230° C., 2.16 kg) [in g/10 min] measured according ISO 1133 of the first random propylene copolymer (A),
MFR(C) is the melt flow rate $MFR_2$ (230° C., 2.16 kg) [in g/10 min] measured according ISO 1133 of the Polypropylene composition (P),
MFR(B) is the calculated melt flow rate $MFR_2$ (230° C., 2.16 kg) [in g/10 min] of the second random propylene copolymer (B).

The xylene cold solubles (XCS, wt.-%): Content of xylene cold solubles (XCS) is determined at 25° C. according ISO 16152; first edition; 2005-07-01.

Hexane Solubles (Wt.-%)

FDA section 177.1520

1 g of a polymer film of 100 µm thickness is added to 400 ml hexane at 50° C. for 2 hours while stirring with a reflux cooler.

After 2 hours the mixture is immediately filtered on a filter paper No 41.

The precipitate is collected in an aluminium recipient and the residual hexane is evaporated on a steam bath under $N_2$ flow.

The amount of hexane solubles is determined by the formula ((wt. sample+wt. crucible)−(wt crucible))/(wt. sample)·100.

Melting temperature $T_m$, crystallization temperature $T_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Haze was determined according to ASTM D1003-00 on blown films of 50 µm thickness.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

Sealing Initiation Temperature (SIT); Sealing End Temperature (SET), Sealing Range:

The method determines the sealing temperature range (sealing range) of polypropylene films, in particular blown films or cast films. The sealing temperature range is the temperature range, in which the films can be sealed according to conditions given below. The lower limit (heat sealing initiation temperature (SIT)) is the sealing temperature at which a sealing strength of >3 N is achieved. The upper limit (sealing end temperature (SET)) is reached, when the films stick to the sealing device.

The sealing range is determined on a J&B Universal Sealing Machine Type 3000 with a film of 50 µm thickness with the following further parameters:
Specimen width: 25.4 mm
Seal Pressure: 0.1 N/mm$^2$
Seal Time: 0.1 sec
Cool time: 99 sec
Peel Speed: 10 mm/sec
Start temperature: 80° C.
End temperature: 150° C.
Increments: 10° C.
specimen is sealed A to A at each sealbar temperature and seal strength (force) is determined at each step.

The temperature is determined at which the seal strength reaches 3 N.

Hot Tack Force:

The hot tack force is determined on a J&B Hot Tack Tester with a film of 50 µm thickness with the following further parameters:
Specimen width: 25.4 mm
Seal Pressure: 0.3 N/mm$^2$
Seal Time: 0.5 sec
Cool time: 99 see
Peel Speed: 200 mm/sec
Start temperature: 90° C.
End temperature: 140° C.
Increments: 10° C.

The maximum hot tack force, i.e the maximum of a force/temperature diagram is determined and reported.

Tensile modulus in machine and transverse direction were determined according to ISO 527-3 on 50 µm blown films at a cross head speed of 1 mm/min.

Dart-drop strength (DDI) is measured using ASTM D1709, method A (Alternative Testing Technique) from the film samples. A dart with a 38 mm diameter hemispherical head is dropped from a height of 0.66 m onto a film clamped over a hole. Successive sets of twenty specimens are tested. One weight is used for each set and the weight is increased (or decreased) from set to set by uniform increments. The weight resulting in failure of 50% of the specimens is calculated and reported.

2. Examples

Preparation of the Catalyst

The catalyst used in the inventive examples is prepared as described in detail in WO 2015/011135 A1 (metallocene complex MC1 with methylaluminoxane (MAO) and borate resulting in Catalyst 3 described in WO 2015/011135 A1) with the proviso that the surfactant is 2,3,3,3-tetrafluoro-2-(1,1,2,2,3,3-heptafluoropropoxy)-1-propanol. The metallocene complex (MC1 in WO 2015/011135 A1) is prepared as described in WO 2013/007650 A1 (metallocene E2 in WO 2013/007650 A1).

Preparation of the Copolymer (C)

The copolymers (C) were prepared in a sequential process comprising a loop reactor and a gas phase reactor. The reaction conditions are summarized in Table 1.

TABLE 1

Preparation of the Polypropylene composition (P)

|  |  | C1 | C2 |
|---|---|---|---|
| Prepolymerization |  |  |  |
| Temperature | [° C.] | 20 | 20 |
| Catalyst feed | [g/h] | 2.5 | 2.5 |
| TEAL/C3 | [g/t] | 0 | 0 |
| C3 feed | [kg/h] | 60.9 | 60.7 |
| H2 feed | [g/h] | 0.5 | 0.5 |
| Residence time | [h] | 0.2 | 0.2 |
| Loop (R1) |  |  |  |
| Temperature | [° C.] | 70 | 70 |
| Pressure | [kPa] | 5297 | 5292 |
| H2/C3 ratio | [mol/kmol] | 0.08 | 0.08 |
| C6/C3 ratio | [mol/kmol] | 15.5 | 14.1 |
| MFR2 | [g/10 min] | 1.9 | 1.8 |
| XCS | [wt. -%] | 1.9 | 1.9 |
| C6 | [wt. -%] | 1.7 | 1.7 |
| Residence time | [h] | 0.5 | 0.5 |
| Split | [wt. -%] | 42.5 | 42.0 |
| GPR (R2) |  |  |  |
| Temperature | [° C.] | 80 | 80 |
| Pressure | [kPa] | 2406 | 2406 |
| H2/C3 ratio | [mol/kmol] | 0.3 | 0.8 |
| C6/C3 ratio | [mol/kmol] | 8.7 | 9.2 |
| C6 (GPR) | [wt. -%] | 6.9 | 8.2 |
| MFR$_2$ (GPR) | [g/10 min] | 1.1 | 1.2 |
| Residence time | [h] | 2.6 | 2.6 |
| Split | [wt. -%] | 57.5 | 58.0 |
| C6 | [wt. -%] | 5.0 | 5.5 |
| XCS | [wt. -%] | 13.8 | 25.0 |
| C6 (XCS) | [wt. -%] | 6.0 | 7.2 |
| 1,2e | [mol-%] | 0.46 | 0.47 |
| MFR$_2$ (copolymer) | [g/10 min] | 1.4 | 1.4 |
| MFR(C)/MFR(A) | [-] | 0.74 | 0.74 |

Preparation of the Polypropylene Composition (P)

The polypropylene composition (P) was obtained by melt blending the copolymer (C) with the plastomer (PL) in amounts as indicated in Table 2 in a co-rotating twin-screw extruder. The properties of the polypropylene composition (P) and 50 μm blown films made therefrom are summarized in Table 2.

PL1 is the commercial copolymer of ethylene and 1-octene Queo 8230 of Borealis having a melt flow rate (190° C., 2.16 kg) of 30.0 g/10 min, a melting temperature Tm of 76° C., a glass transition temperature Tg of −51° C., a density of 0.882 g/cm³ and an ethylene content of 76.2 wt.-%.

PL2 is the commercial copolymer of ethylene and 1-octene Queo 8201 of Borealis having a melt flow rate (190° C., 2.16 kg) of 1.1 g/10 min, a melting temperature Tm of 72° C., a glass transition temperature Tg of −52° C., a density of 0.882 g/cm³ and an ethylene content of 75.5 wt.-%

PL3 is the commercial copolymer of ethylene and 1-octene Engage 8100 by Dow having a melt flow rate (190° C., 2.16 kg) of 1.0 g/10 min, a melting temperature Tm of 60° C., a glass transition temperature Tg of −52° C., a density of 0.870 g/cm³ and an ethylene content of 74.0 wt.-%.

C3 is the commercial nucleated C2/C3 copolymer RB709CF of Borealis having a melt flow rate (230° C., 2.16 kg) of 1.5 g/10 min, a melting temperature Tm of 141° C., a xylene soluble content of 15.0 wt.-% and an ethylene content of 5.5 wt.-%.

C4 is a C2/C3/C4-terpolymer prepared in the presence of a Ziegler-Natta catalyst having a melt flow rate (230° C., 2.16 kg) of 1.6 g/10 min, a melting temperature Tm of 135° C., a xylene soluble content of 10.7 wt.-% a 1-butene content of 7.1 wt.-% and an ethylene content of 1.6 wt.-%. It is identical with comparative example CE1 of EP 17186987.

All film properties were determined on monolayer blown films of 50 μm thickness produced on a Collin blown film line. This line has a screw diameter of 30 millimeters (mm), L/D of 30, a die diameter of 60 mm, a die gap of 1.5 mm and a duo-lip cooling ring. The film samples were produced at 190° C. with an average thickness of 50 μm, with a 2.5 blow-up-ratio and an output rate of about 8 kilograms per hour (kg/h).

As can be gathered from Table 2, the inventive compositions comprising a copolymer of propylene and 1-hexene in accordance with the present invention show excellent haze values before and after sterilization while the tensile modulus remains on a high level.

TABLE 2

Composition and properties of the inventive and comparative examples

|  |  | CE1 | CE2 | IE1 | IE2 | IE3 | IE4 |
|---|---|---|---|---|---|---|---|
| C1 | [wt. -%] |  |  | 90 | 95 |  |  |
| C2 | [wt. -%] |  |  |  |  | 90 | 90 |
| C3 | [wt. -%] | 100 |  |  |  |  |  |
| C4 | [wt. -%] |  | 90 |  |  |  |  |
| PL1 | [wt. -%] |  |  | 10 | 10 | 5 |  |
| PL2 | [wt. -%] |  |  |  |  | 10 |  |
| PL3 | [wt. -%] |  |  |  |  |  | 10 |
| Tm | [° C.] | 141 | 135 | 139 | 139 | 135 | 135 |
| MFR$_2$ | [g/10 min] | 1.5 | 2.8 | 2.7 | 2.0 | 1.6 | 1.5 |
| 50 μm blown film |  |  |  |  |  |  |  |
| SIT | [° C.] | 114 | 105 | 102 | 105 | 107 | 102 |
| Tm - SIT | [° C.] | 27 | 30 | 37 | 34 | 28 | 33 |
| HTF | [N] | 5.3 | 5.0 | 5.3 | 4.7 | 2.8 | 3.3 |
| TM/MD | [MPa] | 707 | 438 | 497 | 592 | 663 | 536 |
| TM/TD | [MPa] | 700 | 429 | 486 | 592 | 652 | 560 |
| DDI | [g] | 70 | 97 | 540 | 618 | 301 | >1700 |
| Haze b.s. | [%] | 12.0 | 8.5 | 6.0 | 4.3 | 3.8 | 1.9 |
| Haze a.s. | [%] | 14.0 | 9.0 | 5.6 | 4.1 | 2.6 | 2.6 |

The invention claimed is:

1. A polypropylene composition (P), comprising
a) 80.0 to 99.0 wt. %, based on the overall weight of the polypropylene composition (P), of a copolymer (C) of propylene and 1-hexene, comprising
  i) a first random propylene copolymer (A) of propylene and 1-hexene, the first random propylene copolymer (A) having a 1-hexene content in the range of 1.0 to 2.5 wt.-% and having a melt flow rate MFR$_2$ (230° C., 2.16 kg) determined according to ISO 1133 in the range of 0.3 to 1.9 g/10 min, and
  ii) a second random propylene copolymer (B) of propylene and 1-hexene having a higher 1-hexene content than the first random propylene copolymer (A), the second random propylene copolymer (B) having a 1-hexene content in the range of 6.5 to 10.0 wt.-% and having a melt flow rate MFR$_2$ (230° C., 2.16 kg) determined according to ISO 1133 in the range of 0.1 to 1.2 g/10 min, wherein the copolymer (C) has a 1-hexene content in the range of 4.0 to 7.0 wt.-%, has a xylene soluble content (XCS) in the range of 10.0 to 26.0 wt.-%, wherein a 1-hexene content of the xylene soluble fraction C6 (XCS) is in the range of 3.0 to 8.0 wt.-%, and a melt flow rate MFR$_2$ (230° C., 2.16 kg) determined according to ISO 1133 in the range of 0.4 to 1.4 g/10 min, and copolymer (C) is free of any elastomeric polymer component and is not a heterophasic polypropylene, and b) 1.0 to 20.0 wt. %, based on the overall weight of the polypropylene composition (P), of a plastomer (PL) which is an elastomeric copolymer of ethylene and at least one $C_4$ to $C_{10}$ α-olefin having a density in the range of 0.860 to 0.930 g/cm³;

the polypropylene composition (P) has a melting temperature (Tm) measured according to ISO 11357-3 of at least 120° C., and a difference between the melting temperature (Tm) and a heat sealing initiation temperature (SIT) fulfilling the equation Tm−SIT>20° C., and the polypropylene composition (P) exhibits a dart-drop strength (DDI) of 300 to 1700 g, determined according to ASTM D1709, method A, when measured on a 50 μm blown film, and a haze value before steam sterilization of 1.9 to 6.5%, as determined according to ASTM D-1003-00, on a 50 μm blown film.

2. The polypropylene composition (P) according to claim 1, wherein the copolymer (C) has an amount of 2,1 erythro regio-defects of at least 0.4 mol. %.

3. The polypropylene composition (P) according to claim 1, wherein the weight ratio between the first random propylene copolymer (A) and the second random propylene copolymer (B) within the copolymer (C) is in the range of 30:70 to 70:30.

4. The polypropylene composition (P) according to claim 1, wherein the copolymer (C) fulfils in-equation (1)

$$\text{MFR}(C)/\text{MFR}(A) \leq 1.0 \tag{1}$$

wherein MFR(A) is the melt flow rate MFR$_2$ (230° C., 2.16 kg) determined according to ISO 1133 in [g/10 min] of the first random propylene copolymer (A) and MFR(C) is the melt flow rate MFR$_2$ (230° C., 2.16 kg) determined according to ISO 1133 in [g/10 min] of the copolymer (C).

5. The polypropylene composition (P) according to claim 1, wherein the copolymer (C) fulfils in-equation (2)

$$4.5 \leq \frac{C6(C)}{C6(A) * \frac{|A|}{|C|}} \leq 9.0 \tag{2}$$

wherein

C6(A) is the 1-hexene content of the first random propylene copolymer (A) based on the total weight of the first random propylene copolymer (A) [in wt. %];

C6(C) is the 1-hexene content of the copolymer (C) based on the total weight of the copolymer (C) [in wt. %]; and

[A]/[C] is the weight ratio between the first random propylene copolymer (A) and the copolymer (C) [in g/g].

6. The polypropylene composition (P) according to claim 1, wherein the plastomer (PL) has a density in the range of 0.865 to 0.920 g/cm³.

7. The polypropylene composition (P) according to claim 1, wherein the plastomer (PL) is a copolymer of ethylene and 1-octene.

8. The polypropylene composition (P) according to claim 1, wherein
i) the first random propylene copolymer (A) has a melt flow rate MFR$_2$ (230° C., 2.16 kg) determined according to ISO 1133 in the range of 1.0 to 1.6 g/10 min, and/or
ii) the second random propylene copolymer (B) has a melt flow rate MFR$_2$ (230°° C., 2.16 kg) determined according to ISO 1133 in the range of 0.8 to 1.1 g/10 min.

9. An article comprising at least 90.0 wt. % of a polypropylene composition (P), the polypropylene composition (P) comprising a) 80.0 to 99.0 wt. %, based on the overall weight of the polypropylene composition (P), of a copolymer (C) of propylene and 1-hexene, comprising
i) a first random propylene copolymer (A) of propylene and 1-hexene, the first random propylene copolymer (A) having a 1-hexene content in the range of 1.0 to 2.5 wt.-% and having a melt flow rate MFR$_2$ (230° C., 2.16 kg) determined according to ISO 1133 in the range of 0.3 to 1.9 g/10 min, and
ii) a second random propylene copolymer (B) of propylene and 1-hexene having a higher 1-hexene content than the first random propylene copolymer (A), the second random propylene copolymer (B) having the 1-hexene content in the range of 6.5 to 10.0 wt.-% and having a melt flow rate MFR$_2$ (230° C., 2.16 kg) determined according to ISO 1133 in the range of 0.7 to 1.2 g/10 min, wherein the copolymer (C) has the 1-hexene content in the range of 4.0 to 7.0 wt.-%, has a xylene soluble content (XCS) in the range of 10.0 to 26.0 wt. %, wherein the 1-hexene content of the xylene soluble fraction C6 (XCS) is in the range of 3.0 to 8.0 wt.-%, and has a melt flow rate MFR$_2$ (230° C., 2.16 kg) determined according to ISO 1133 in the range of 0.4 to 1.4 g/10 min, and copolymer (C) is free of any elastomeric polymer component and is no heterophasic polypropylene, and b) 1.0 to 20.0 wt. %, based on the overall weight of the polypropylene composition (P), of a plastomer (PL) which is an elastomeric copolymer of ethylene and at least one $C_4$ to $C_{10}$ α-olefin having a density in the range of 0.860 to 0.930 g/cm³, the polypropylene composition (P) having a melting temperature (Tm) measured according to ISO 11357-3 of at least 120° C., and a difference between the melting temperature (Tm) and a heat sealing initiation temperature (SIT) fulfilling the equation Tm−SIT>20° C., and the polypropylene composition (P) exhibiting a dart-drop strength (DDI) of 300 to 1700 g, as determined according to ASTM D1709, method A, when measured on a 50 μm blown film, and a haze value before steam sterilization of 1.9 to 6.5%, as determined according to ASTM D-1003-00, on a 50 μm blown film.

10. The article according to claim 9, wherein the article is a film.

11. The article according to claim 10, wherein the film has a haze after steam sterilization determined according to ASTM D 1003-00 measured on a 50 μm blown film below 12.0%.

12. A sealing layer in a multi-layer film, the sealing layer comprising a film comprising at least 90.0 wt. % of a polypropylene composition (P), the polypropylene composition (P) comprising a) 80.0 to 99.0 wt. %, based on the overall weight of the polypropylene composition (P), of a copolymer (C) of propylene and 1-hexene, comprising
  i) a first random propylene copolymer (A) of propylene and 1-hexene, the first random propylene copolymer (A) having the 1-hexene content in the range of 1.0 to 2.5 wt.-% and having a melt flow rate MFR$_2$ (230° C., 2.16 kg) determined according to ISO 1133 in the range of 0.3 to 1.9 g/10 min, and
  ii) a second random propylene copolymer (B) of propylene and 1-hexene having a higher 1-hexene content than the first random propylene copolymer (A), the second random propylene copolymer (B) having the 1-hexene content in the range of 6.5 to 10.0 wt.-% and having a melt flow rate MFR$_2$ (230° C., 2.16 kg) determined according to ISO 1133 in the range of 0.7 to 1.2 g/10 min,
  wherein the copolymer (C) has the 1-hexene content in the range of 4.0 to 7.0 wt.-%, has a xylene soluble content (XCS) in the range of 10.0 to 26.0 wt. %, wherein the 1-hexene content of the xylene soluble fraction C6 (XCS) is in the range of 3.0 to 8.0 wt.-%, and has a melt flow rate MFR$_2$ (230° C., 2.16 kg) determined according to ISO 1133 in the range of 0.4 to 1.4 g/10 min, and copolymer (C) is free of any elastomeric polymer component and is no heterophasic polypropylene, and
b) 1.0 to 20.0 wt. %, based on the overall weight of the polypropylene composition (P), of a plastomer (PL) which is an elastomeric copolymer of ethylene and at least one C$_4$ to C$_{10}$ α-olefin having a density in the range of 0.860 to 0.930 g/cm$^3$,
the polypropylene composition (P) having a melting temperature (Tm) measured according to ISO 11357-3 of at least 120° C., and a difference between the melting temperature (Tm) and a heat sealing initiation temperature (SIT) fulfilling the equation Tm–SIT>20° C., and
the polypropylene composition (P) exhibiting a dart-drop strength (DDI) of 300 to 1700 g, as determined according to ASTM D1709, method A, when measured on a 50 μm blown film, and a haze value before steam sterilization of 1.9 to 6.5%, as determined according to ASTM D-1003-00, on a 50 μm blown film.

13. A process for the preparation of a polypropylene composition (P), the polypropylene composition (P) comprising
a) 80.0 to 99.0 wt. %, based on the overall weight of the polypropylene composition (P), of a copolymer (C) of propylene and 1-hexene, comprising
  i) a first random propylene copolymer (A) of propylene and 1-hexene, the first random propylene copolymer (A) having a 1-hexene content in the range of 1.0 to 2.5 wt.-% and having a melt flow rate MFR$_2$ (230° C., 2.16 kg) determined according to ISO 1133 in the range of 0.3 to 1.9 g/10 min, and
  ii) a second random propylene copolymer (B) of propylene and 1-hexene having a higher 1-hexene content than the first random propylene copolymer (A), the second random propylene copolymer (B) having the 1-hexene content in the range of 6.5 to 10.0 wt.-% and having a melt flow rate MFR$_2$ (230° C., 2.16 kg) determined according to ISO 1133 in the range of 0.7 to 1.2 g/10 min,
  wherein the copolymer (C) has a 1-hexene content in the range of 4.0 to 7.0 wt.-%, has a xylene soluble content (XCS) in the range of 10.0 to 26.0 wt. %, wherein the 1-hexene content of the xylene soluble fraction C6 (XCS) is in the range of 3.0 to 8.0 wt.-%, and has a melt flow rate MFR$_2$ (230° C., 2.16 kg) determined according to ISO 1133 in the range of 0.4 to 1.4 g/10 min, and copolymer (C) is free of any elastomeric polymer component and is no heterophasic polypropylene, and
b) 1.0 to 20.0 wt. %, based on the overall weight of the polypropylene composition (P), of a plastomer (PL) which is an elastomeric copolymer of ethylene and at least one C$_4$ to C$_{10}$ α-olefin having a density in the range of 0.860 to 0.930 g/cm$^3$,
the polypropylene composition (P) having a melting temperature (Tm) measured according to ISO 11357-3 of at least 120° C., and a difference between the melting temperature (Tm) and a heat sealing initiation temperature (SIT) fulfilling the equation Tm–SIT>20° C., and
the polypropylene composition (P) exhibiting a dart-drop strength (DDI) of 300 to 1700 g, as determined according to ASTM D1709, method A, when measured on a 50 μm blown film, and a haze value before steam sterilization of 1.9 to 6.5%, as determined according to ASTM D-1003-00, on a 50 μm blown film,
wherein the process is a sequential polymerization process comprising at least two reactors connected in series, wherein said process comprises:
  (A) polymerizing in a first reactor (R-1) being a slurry reactor (SR), propylene and 1-hexene, obtaining a first random propylene copolymer (A),
  (B) transferring said first random propylene copolymer (A) and unreacted comonomers of the first reactor (R-1) in a second reactor (R-2) which is a gas phase reactor (GPR-1),
  (C) feeding to said second reactor (R-2) propylene and 1-hexene,
  (D) polymerizing in said second reactor (R-2) and in the presence of said first random propylene copolymer (A) propylene and 1-hexene obtaining a second random propylene copolymer (B), said first random propylene copolymer (A) and said second random propylene copolymer (B) form the copolymer (C), and
  (E) blending the copolymer (C) with the plastomer (PL) and obtaining the polypropylene composition (P),
wherein further in the first reactor (R-1) and second reactor (R-2), the polymerization takes place in the presence of a solid catalyst system (SCS), said solid catalyst system (SCS) comprising a transition metal compound of formula (I)

$$R_n(Cp)_2MX_2 \qquad (I)$$

wherein:
each Cp independently is an unsubstituted or substituted and/or fused cyclopentadienyl ligand, substituted or unsubstituted indenyl or substituted or unsubstituted fluorenyl ligand, wherein the optional one or more substituent(s) is/are independently selected from the group consisting of halogen, C$_1$-C$_{20}$-alkyl, C$_2$-C$_{20}$-alkenyl, C$_2$-C$_{20}$-alkynyl, C$_3$-C$_{12}$-cycloalkyl, C$_6$-C$_{20}$-aryl, C$_7$-C$_{20}$-arylalkyl, C$_3$-C$_{12}$-cycloalkyl which contains 1, 2, 3 or 4 heteroatom(s) in the ring moiety, C$_6$-C$_{20}$-heteroaryl, C$_1$-C$_{20}$-haloalkyl, —SiR"$_3$, —OSiR"$_3$, —SR", —PR"$_2$, —OR", and —NR"$_2$,
wherein each R" is independently a hydrogen or a hydrocarbyl selected from the group consisting of C$_1$-C$_{20}$-alkyl, C$_2$-C$_{20}$-alkenyl, C$_2$-C$_{20}$-alkynyl, C$_3$-C$_{12}$-cycloalkyl, and C$_6$-C$_{20}$-aryl or in case of —NR"$_2$, the two substituents R" optionally form a five- or six-membered ring, together with the nitrogen atom to which they are attached;

R is a bridge of 1-2 C-atoms and 0-2 heteroatoms, wherein the heteroatom(s) can be Si, Ge and/or O atom(s), wherein each of the bridge atoms optionally bears independently substituents selected from the group consisting of $C_1$-$C_{20}$-alkyl, tri($C_1$-$C_{20}$-alkyl) silyl, tri($C_1$-$C_{20}$-alkyl) siloxy, and $C_6$-$C_{20}$-aryl substituents, or R is a bridge of one or two heteroatoms selected from the group consisting of silicon, germanium, oxygen atom(s), and any combination thereof, M is Zr or Hf;

each X is independently a sigma-ligand selected from the group consisting of H, halogen, $C_1$-$C_{20}$-alkyl, $C_1$-$C_{20}$-alkoxy, $C_2$-$C_{20}$-alkenyl, $C_2$-$C_{20}$-alkynyl, $C_3$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —SR", —PR"$_3$, —SiR"$_3$, —OSiR"$_3$, —NR"$_2$, and —CH$_2$—Y, wherein Y is $C_6$-$C_{20}$-aryl, $C_6$-$C_{20}$-heteroaryl, $C_1$-$C_{20}$-alkoxy, $C_6$-$C_{20}$-aryloxy, NR"$_2$, —SR", —PR"$_3$, —SiR"$_3$, or —OSiR"$_3$;

each of the above mentioned ring moieties alone or as a part of another moiety as the substituent for Cp, X, R" or R optionally is further substituted with $C_1$-$C_{20}$-alkyl which may contain Si and/or O atoms; and n is 1 or 2.

14. The process according to claim 13, wherein the transition metal compound of formula (I) is an organozirconium compound of formula (II) or (II'):

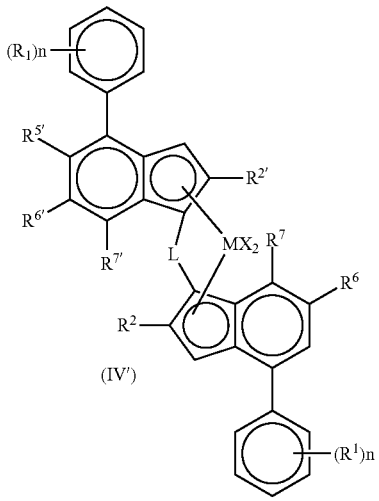

(II)

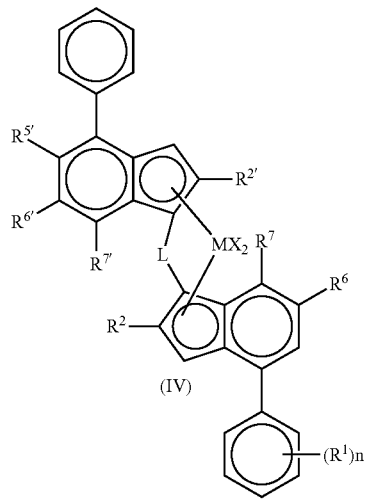

(II')

wherein:

M is Zr;

each X is independently a hydrogen atom, a halogen atom, a $C_1$-$C_6$ alkoxy group, $C_1$-$C_6$ alkyl, a phenyl group, or a benzyl group;

L is a divalent bridge selected from the group consisting of —R'$_2$C—, —R'$_2$C—CR'$_2$, —R'$_2$Si—, —R'$_2$Si—SiR'$_2$—, and —R'$_2$Ge—, wherein each R' is independently a hydrogen atom, $C_1$-$C_{20}$ alkyl, $C_3$-$C_{10}$ cycloalkyl, tri($C_1$-$C_{20}$-alkyl) silyl, $C_6$-$C_{20}$-aryl or $C_7$-$C_{20}$ arylalkyl;

each $R^2$ or $R^{2'}$ is a $C_1$-$C_{10}$ alkyl group;

$R^{5'}$ is a $C_1$-$C_{10}$ alkyl group or a Z'R$^{3'}$ group;

$R^6$ is hydrogen or a $C_1$-$C_{10}$ alkyl group;

$R^{6'}$ is a $C_1$-$C_{10}$ alkyl group or a $C_6$-$C_{10}$ aryl group;

$R^7$ is hydrogen, a $C_1$-$C_6$ alkyl group or a ZR$^3$ group;

$R^{7'}$ is hydrogen or a $C_1$-$C_{10}$ alkyl group;

Z and Z' are independently O or S;

$R^{3'}$ is a $C_1$-$C_{10}$ alkyl group, or a $C_6$-$C_{10}$ aryl group optionally substituted by one or more halogen groups;

$R^3$ is a $C_1$-$C_{10}$ alkyl group;

each n is independently 0 to 4;

and each $R^1$ is independently a $C_1$-$C_{20}$ hydrocarbyl group.

* * * * *